United States Patent
Sodeyama

(10) Patent No.: US 11,276,894 B2
(45) Date of Patent: Mar. 15, 2022

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventor: Kunio Sodeyama, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 168 days.

(21) Appl. No.: 16/693,671

(22) Filed: Nov. 25, 2019

(65) Prior Publication Data

US 2020/0091469 A1 Mar. 19, 2020

Related U.S. Application Data

(63) Continuation of application No. PCT/JP2018/016086, filed on Apr. 19, 2018.

(30) Foreign Application Priority Data

Jun. 7, 2017 (JP) .............................. JP2017-112604

(51) Int. Cl.
*H01M 50/152* (2021.01)
*H01M 50/183* (2021.01)
(Continued)

(52) U.S. Cl.
CPC ....... *H01M 50/152* (2021.01); *H01M 50/183* (2021.01); *H01M 10/04* (2013.01);
(Continued)

(58) Field of Classification Search
CPC .... H01M 50/20; H01M 50/152; H01M 50/30; H01M 10/0587; H01M 10/04;
(Continued)

(56) References Cited

U.S. PATENT DOCUMENTS 5,462,820 A 10/1995 Tanaka
8,062,786 B2 11/2011 Kim et al.
(Continued)

FOREIGN PATENT DOCUMENTS

JP 20000030674 1/2000
JP 2006221909 A 8/2006
(Continued)

OTHER PUBLICATIONS

Japanese Office Action dated Dec. 22, 2020, in corresponding Japanese Application No. 2019-523381.

(Continued)

*Primary Examiner* — Jonathan G Jelsma
*Assistant Examiner* — Omar M Kekia
(74) *Attorney, Agent, or Firm* — K&L Gates LLP

(57) ABSTRACT

A secondary battery includes a housing member having a bent portion defining an open end, a battery element, a lid member which extends in a cross direction crossing a housing direction of the battery element to the housing member to close the open end of the housing member and has a bottom surface facing the battery element, a top surface opposite to the bottom surface, and a side surface coupled to the bottom surface and the top surface, and a sealing member interposed between the bent portion and the lid member. The bent portion includes a specific bent portion bent along each of the side surface and the top surface of the lid member. A bending ratio R1 (=(L1/D1)×100%) is 10% or more and 13% or less.

12 Claims, 7 Drawing Sheets

(51) Int. Cl.
*H01M 50/20* (2021.01)
*H01M 50/10* (2021.01)
*H01M 50/30* (2021.01)
*H01M 50/147* (2021.01)
*H01M 10/04* (2006.01)
*H01M 10/0587* (2010.01)
*H01M 10/052* (2010.01)

(52) U.S. Cl.
CPC ...... *H01M 10/052* (2013.01); *H01M 10/0587* (2013.01); *H01M 50/10* (2021.01); *H01M 50/147* (2021.01); *H01M 50/20* (2021.01); *H01M 50/30* (2021.01); *H01M 2220/20* (2013.01); *Y02E 60/10* (2013.01); *Y02P 70/50* (2015.11)

(58) Field of Classification Search
CPC .. H01M 50/10; H01M 50/147; H01M 10/052; H01M 2220/20; H01M 50/183; Y02E 60/10
USPC ......................................................... 429/194
See application file for complete search history.

(56) References Cited

U.S. PATENT DOCUMENTS

| | | | |
|---|---|---|---|
| 8,889,288 B2 | 11/2014 | Kim et al. | |
| 8,999,564 B2 | 4/2015 | Kim et al. | |
| 2006/0078787 A1* | 4/2006 | Sato | H01M 50/581 |
| | | | 429/62 |
| 2006/0228620 A1* | 10/2006 | Martinson | H01M 50/538 |
| | | | 429/56 |
| 2012/0094169 A1* | 4/2012 | Kim | H01M 50/116 |
| | | | 429/164 |
| 2013/0273401 A1 | 10/2013 | Lee et al. | |
| 2015/0104692 A1 | 4/2015 | Nakamura et al. | |
| 2016/0211507 A1* | 7/2016 | Sharma | H01M 4/0402 |
| 2017/0005371 A1* | 1/2017 | Chidester | B60L 15/20 |

FOREIGN PATENT DOCUMENTS

| | | |
|---|---|---|
| JP | 2010282824 A | 12/2010 |
| JP | 2012243635 A | 12/2012 |
| JP | 5160559 B2 | 3/2013 |
| JP | 5269793 B2 | 8/2013 |
| JP | 2014-524118 | 9/2014 |
| JP | 2015-076350 | 4/2015 |
| KR | 10-2008-0053538 | 6/2008 |
| KR | 10-2008-0109949 | 12/2008 |
| KR | 10-2012-0038205 | 4/2012 |

OTHER PUBLICATIONS

International Search Report for Application No. PCT/JP2018/016086, dated Jul. 3, 2018.
Korean Office Action dated May 31, 2021 in corresponding Korean Application No. 10-2019-7035263.
Extended Search Report dated Feb. 15, 2021 in corresponding European Application No. 18813276.5.
Chinese Office Action dated Oct. 28, 2021 in corresponding Chinese Application No. 201880036402.3.

* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present application is a continuation of PCT patent application no. PCT/JP2018/016086, filed on Apr. 19, 2018, which claims priority to Japanese patent application no. JP2017-112604 filed on Jun. 7, 2017, the entire contents of which are being incorporated herein by reference.

BACKGROUND

The present technology generally relates to a secondary battery in which a battery element is housed in a housing member, and a battery pack, an electric vehicle, an electric power storage system, an electric power tool, and an electronic apparatus that use the secondary battery.

Various electronic apparatuses such as a mobile phone have been widely used, and, for example, it has been demanded to reduce the sizes and weights of the electronic apparatuses and to achieve their long life. Thus, as an electric power source for the electronic apparatuses, a small and light-weight secondary battery capable of providing high energy density has been developed.

It has been considered to apply a secondary battery not only to the foregoing electronic apparatuses, but also to other applications. Examples of other applications include a battery pack detachably mounted in electronic apparatuses or the like, an electric vehicle such as an electric automobile, an electric power storage system such as a home electric power server, and an electric power tool such as an electric drill.

The secondary battery includes a battery element and a housing member in which the battery element is housed. The battery element includes an electrolytic solution as well as a positive electrode and a negative electrode. One end of the housing member is open, and one end of the housing member is sealed in a state in which the battery element is housed.

A sealing structure of a secondary battery greatly influences safety of the secondary battery. Thus, various studies have been made regarding the sealing structure of the secondary battery.

SUMMARY

The present technology generally relates to a secondary battery in which a battery element is housed in a housing member, and a battery pack, an electric vehicle, an electric power storage system, an electric power tool, and an electronic apparatus that use the secondary battery.

The electronic apparatuses and the like are increasingly having higher performance and multi-functionality. Accordingly, the frequency of use of electronic apparatuses and the like increases, and, at the same time, a use environment of the electronic apparatuses and the like expands. For this reason, there is still room for improvement in safety of secondary batteries.

The present technology is made in view of the above-described issues, and it is an object thereof to provide a secondary battery, a battery pack, an electric vehicle, an electric power storage system, an electric power tool, and an electronic apparatus that are capable of providing excellent safety.

According to an embodiment of the present disclosure, a secondary battery is provided. The secondary battery includes a housing member having a bent portion defining an open end, a battery element including a positive electrode, a negative electrode, and an electrolytic solution, a lid member which extends in a cross direction crossing a housing direction of the battery element to the housing member to close the open end of the housing member and has a bottom surface facing the battery element, a top surface opposite to the bottom surface, and a side surface coupled to the bottom surface and the top surface, and a sealing member interposed between the bent portion and the lid member. The battery element is configured to be accommodated in the housing member. The bent portion includes a specific bent portion bent along each of the side surface and the top surface of the lid member. A bending ratio $R1$ $(=(L1/D1)\times100\%)$ calculated based on a first outer diameter $D1$ (mm) of the housing member specified by the bent portion in the cross direction and a bending length $L1$ (mm) of the specific bent portion in the cross direction is 10% or more and 13% or less.

Each of a battery pack, an electric vehicle, an electric power storage system, an electric power tool, and an electronic apparatus of the present technology includes a secondary battery, and the secondary battery has a configuration similar to that of the secondary battery according to the embodiment as described herein.

According to the secondary battery of the present technology, since the bending ratio $R1$ satisfies the above conditions, excellent safety can be obtained. In addition, the same effect can be provided in each of the battery pack, the electric vehicle, the electric power storage system, the electric power tool, and the electronic apparatus of the present technology.

The effects described herein are non-limiting, and may be any effect or an effect different from those described in the present technology.

DETAILED DESCRIPTION

As described herein, the present disclosure will be described based on examples with reference to the drawings, but the present disclosure is not to be considered limited to the examples, and various numerical values and materials in the examples are considered by way of example. A First, a secondary battery of an embodiment of the present technology is described.

The secondary battery described here is, for example, a secondary battery using lithium as an electrode reactant, and more specifically, the secondary battery is a lithium ion secondary battery in which capacitance of a negative electrode is obtained using a lithium insertion phenomenon and a lithium extraction phenomenon.

First, a whole configuration of the secondary battery will be described.

Figure 1:
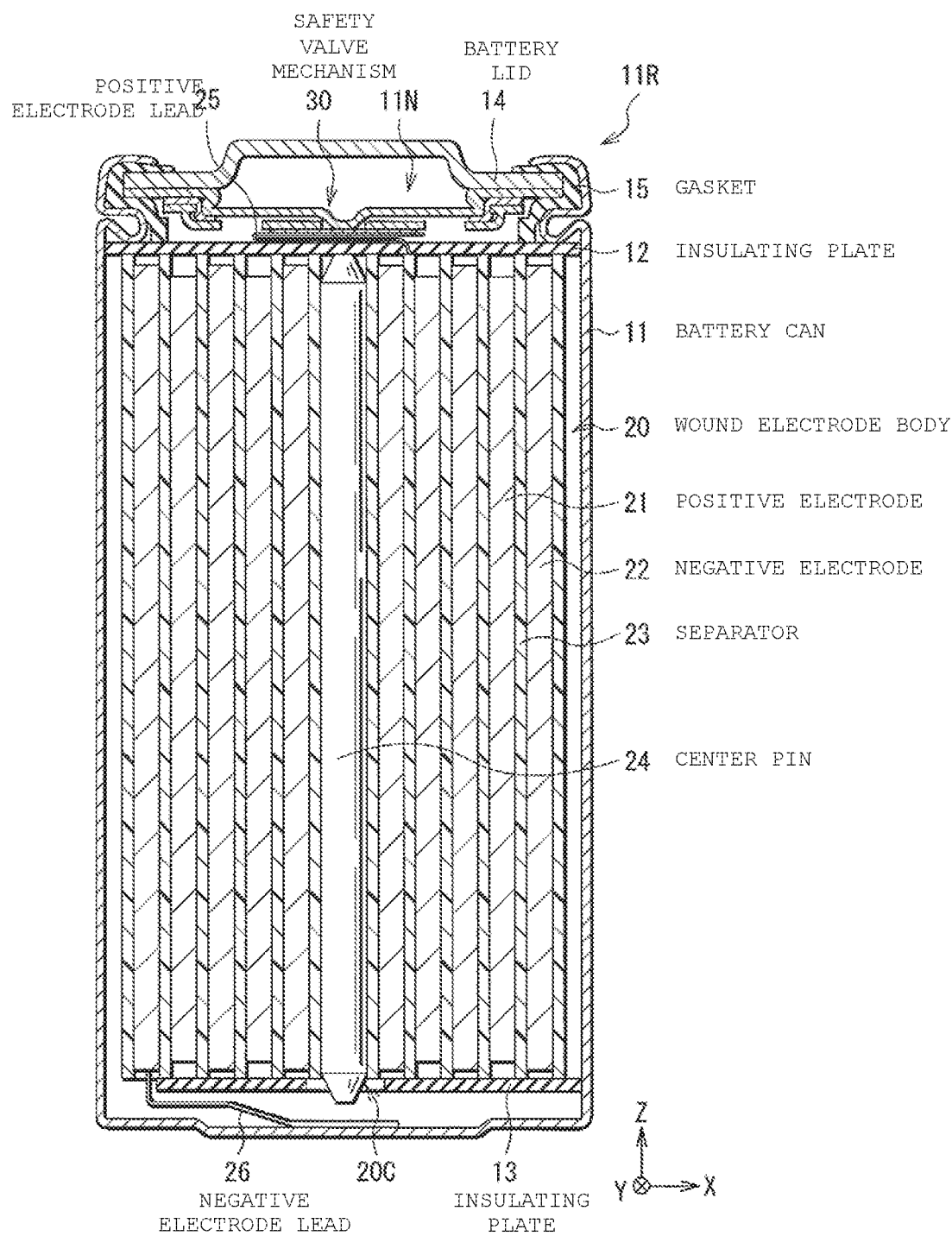
FIG. 1 is a cross-sectional view illustrating a configuration of a secondary battery according to an embodiment of the present technology.

FIG. 1 illustrates a cross-sectional configuration of a secondary battery. For example, as illustrated in FIG. 1, the secondary battery is a cylindrical secondary battery containing a wound electrode body 20 inside a battery can 11. The battery can 11 is a "housing member" in an embodiment of the present technology, and the wound electrode body 20 is a "battery element" in an embodiment of the present technology.

In the following description, a direction (Z-axis direction in FIG. 1) in which the wound electrode body 20 is housed with respect to the battery can 11 is referred to as the "housing direction", and a direction (X-axis direction in FIG. 1) intersecting the housing direction is referred to as the "cross direction".

Specifically, the secondary battery includes, for example, a pair of insulating plates 12 and 13 and the wound electrode body 20 inside the cylindrical battery can 11. However, the secondary battery may further include, for example, one or more of a positive temperature coefficient (PTC) element, a reinforcing member, and the like inside the battery can 11.

The battery can 11 is a member that mainly houses the wound electrode body 20. The battery can 11 is, for example, a cylindrical vessel having one end opened and the other end closed, and extends in the housing direction. That is, the battery can 11 has an open end (open end 11N).

The battery can 11 contains, for example, one or more of metal materials such as iron, aluminum and their alloys. However, one or more of metal materials such as nickel may be plated on the surface of the battery can 11, for example.

Each of the insulating plates 12 and 13 extends, for example, in a direction perpendicular to a winding circumferential surface of the wound electrode body 20, that is, in the cross direction. Furthermore, the insulating plates 12 and 13 are arranged to sandwich the wound electrode body 20 between them, for example.

At the open end 11N of the battery can 11, for example, a battery lid 14 and a safety valve mechanism 30 are crimped with a gasket 15. The battery lid 14 is a "lid member" in an embodiment of the present technology, and the gasket 15 is a "sealing member" in an embodiment of the present technology.

Consequently, the battery can 11 is hermetically sealed in a state in which the wound electrode body 20 and the like are housed inside the battery can 11. Thus, at the open end 11N of the battery can 11, a structure (crimped structure 11R) in which the battery lid 14 and the safety valve mechanism 30 are crimped with the gasket 15 is formed. That is, a bent portion 11P is a so-called crimped portion, and the crimped structure 11R is a so-called crimp structure. A detailed configuration of the crimped structure 11R will be described later (see FIG. 3).

The battery lid 14 is a member that mainly closes the open end 11N of the battery can 11 in a state in which the wound electrode body 20 and the like are housed inside the battery can 11. The battery lid 14 contains, for example, a material similar to a material for forming the battery can 11.

A central region of the battery lid 14 protrudes, for example, in a direction away from the wound electrode body 20. Thus, a region (peripheral region) other than the central region of the battery lid 14 is, for example, adjacent to the safety valve mechanism 30 (a safety cover 31 described later).

The gasket 15 is a member that mainly seals a gap between the bent portion 11P and the battery lid 14 by being interposed between the battery can 11 (the bent portion 11P described later, see FIG. 3) and the battery lid 14. However, a surface of the gasket 15 may be coated with asphalt or the like, for example.

The gasket 15 contains, for example, one or more of insulating materials. The type of insulating material is not particularly limited, and is, for example, a polymeric material such as polybutylene terephthalate (PBT) and polypropylene (PP). In particular, the insulating material is preferably polybutylene terephthalate. This is because the gap between the bent portion 11P and the battery lid 14 is sufficiently sealed while the battery can 11 and the battery lid 14 are electrically separated from each other.

When pressure (internal pressure) inside the battery can 11 increases, the safety valve mechanism 30 mainly releases the internal pressure by releasing the hermetically sealed state of the battery can 11 as necessary. The cause of the increase in the internal pressure of the battery can 11 is, for example, a gas generated due to a decomposition reaction of an electrolytic solution during charge and discharge. A detailed configuration of the safety valve mechanism 30 will be described later.

The wound electrode body 20 includes an electrolytic solution which is a liquid electrolyte together with a positive electrode 21 and a negative electrode 22. Specifically, for example, after the positive electrode 21 and the negative electrode 22 are stacked with a separator 23 interposed therebetween, the positive electrode 21, the negative electrode 22, and the separator 23 are wound to form the wound electrode body 20. The electrolytic solution is, for example, impregnated in each of the positive electrode 21, the negative electrode 22, and the separator 23.

At the center of the wound electrode body 20, for example, a space (center space 20C) generated when the positive electrode 21, the negative electrode 22 and the separator 23 are wound is provided, and, for example, a center pin 24 is inserted in the center space 20C. However, the center pin 24 may not be inserted in the center space 20C.

A positive electrode lead 25 may be coupled to the positive electrode 21, and a negative electrode lead 26 may be coupled to the negative electrode 22. The positive electrode lead 25 contains, for example, one or more of conductive materials such as aluminum. For example, the positive electrode lead 25 may be coupled to the safety valve mechanism 30 and therefore electrically coupled to the battery lid 14. The negative electrode lead 26 contains, for example, one or more of conductive materials such as nickel. For example, the negative electrode lead 26 may be coupled to the battery can 11 and therefore electrically coupled to the battery can 11.

A detailed configuration of the wound electrode body 20, that is, detailed configurations of the positive electrode 21, the negative electrode 22, the separator 23, and the electrolytic solution will be described later (see FIG. 4).

Subsequently, a configuration of the safety valve mechanism 30 will be described.

Figure 2:
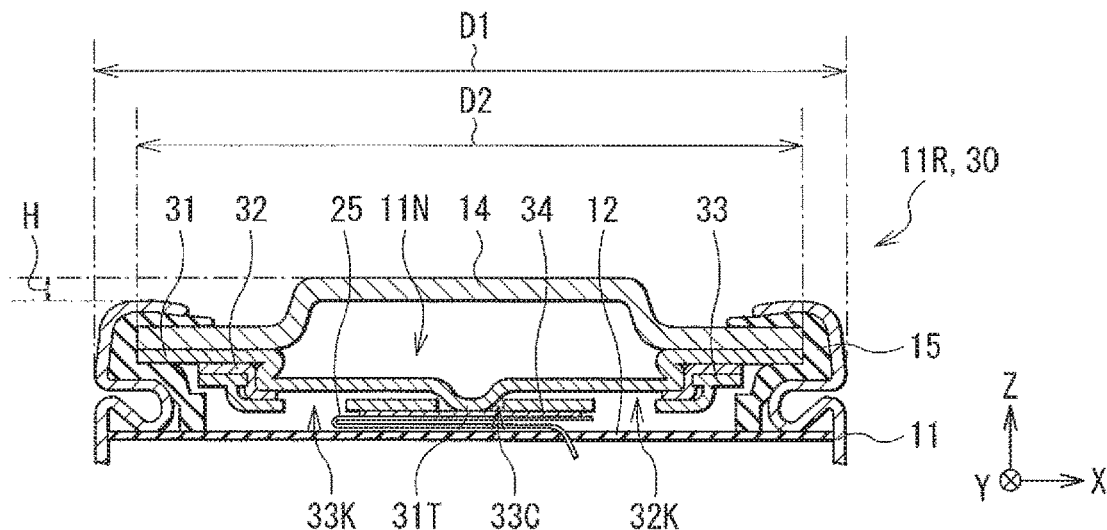
FIG. 2 is a partial cross-sectional view of the secondary battery illustrated in FIG. 1.

FIG. 2 illustrates a partial cross-sectional configuration of the secondary battery illustrated in FIG. 1. For example, as illustrated in FIG. 2, the safety valve mechanism 30 includes a safety cover 31, a disc holder 32, a stripper disc 33, and a sub disc 34. The safety cover 31, the disc holder 32, the stripper disc 33, and the sub disc 34 may be arranged in this order from the side closer to the battery lid 14 (the side farther from the wound electrode body 20), for example.

The safety cover 31 is a member that mainly can partially open in response to an increase in the internal pressure of the battery can 11. When the safety cover 31 partially opens, for example, the safety cover 31 may be split, or a portion of the safety cover 31 may be removed. The safety cover 31 contains, for example, one or more of metal materials such as aluminum and aluminum alloys.

A planar shape of the safety cover 31 is not particularly limited, and is, for example, a substantially circular shape. The "planar shape" is a shape of a surface along an XY plane, and the same applies to the following. The central region of the safety cover 31 protrudes, for example, toward the disc holder 32, and in the central region, for example, a protrusion 31T that partially protrudes toward the disc holder 32 is provided.

The disc holder 32 is a member that mainly aligns the stripper disc 33 with respect to the safety cover 31 by being interposed between the safety cover 31 and the stripper disc 33. The disc holder 32 contains, for example, one or more of polymeric materials such as polypropylene (PP) and polybutylene terephthalate (PBT).

A planar shape of the disc holder 32 is not particularly limited, and is, for example, a substantially circular shape. The central region of the disc holder 32 is, for example, recessed away from the safety cover 31, so that the disc holder 32 is provided with, for example, a recess. The central region of the safety cover 31 described above is, for example, fitted in the recess provided in the disc holder 32, and the central region of the disc holder 32 has a cavity 32K provided at a position corresponding to the central region of the safety cover 31, for example. The opening shape of the cavity 32K is not particularly limited, and is, for example, a substantially circular shape.

The stripper disc 33 is a member that mainly discharges a gas generated inside the battery can 11. The stripper disc 33 contains, for example, one or more of metal materials such as aluminum and aluminum alloys.

A planar shape of the stripper disc 33 is not particularly limited, and is, for example, a substantially circular shape. The central region of the stripper disc 33 is, for example, recessed away from the disc holder 32, so that the stripper disc 33 is provided with, for example, a recess. The central region of the disc holder 32 described above is, for example, fitted in the recess provided in the stripper disc 33, and the central region of the stripper disc 33 has cavities 33C and 33K, for example.

The cavity 33C is an outlet for mainly bringing the protrusion 31T into contact with the sub disc 34 by deriving the protrusion 31T provided on the safety cover 31. The cavity 33C is, for example, disposed at substantially the center of the central region. The opening shape of the cavity 33C is not particularly limited, and is, for example, a substantially circular shape.

The cavity 33K is a vent for mainly discharging a gas generated inside the battery can 11 to the outside. Although the number of the cavities 33K is not particularly limited, it is preferable that a plurality of the cavities 33K be provided. This is because gas is easily discharged using the cavity 33K. The plurality of cavities 33K are, for example, arranged concentrically around the cavity 33C. The opening shape of the cavity 33K is not particularly limited, and is, for example, a substantially circular shape.

The sub disc 34 is a member that mainly electrically couples the safety cover 31 (protrusion 31T) to the positive electrode lead 25 by being interposed between the safety cover 31 and the positive electrode lead 25. The sub disc 34 contains, for example, one or more of metal materials such as aluminum and aluminum alloys. A planar shape of the sub disc 34 is not particularly limited, and is a substantially circular shape or the like.

The positive temperature coefficient device is disposed, for example, between the battery lid 14 and the safety cover 31 and is electrically coupled to each of the battery lid 14 and the safety cover 31. Thus, the positive temperature coefficient device is crimped together with the battery lid 14 and the safety cover 31 with the gasket 15, for example. The positive temperature coefficient device includes, for example, a resistor (thermistor) whose electrical resistance changes significantly in response to a change in temperature. The electrical resistance of the positive temperature coefficient device rapidly increases when a temperature inside the secondary battery exceeds a predetermined temperature in order to prevent, for example, abnormal heat generation of the secondary battery due to a large current. The safety valve mechanism 30 is, for example, electrically coupled to the battery lid 14 with the positive temperature coefficient device interposed therebetween.

The reinforcing member is, for example, disposed between the battery lid 14 and the safety cover 31 similarly to the above-described positive temperature coefficient device, and is crimped together with the battery lid 14 and the safety cover 31 with the gasket 15. The reinforcing member contains, for example, one or more of copper, aluminum, iron and the like, and the reinforcing member may be plated with nickel, for example.

Subsequently, a configuration of the crimped structure 11R will be described.

Figure 3:
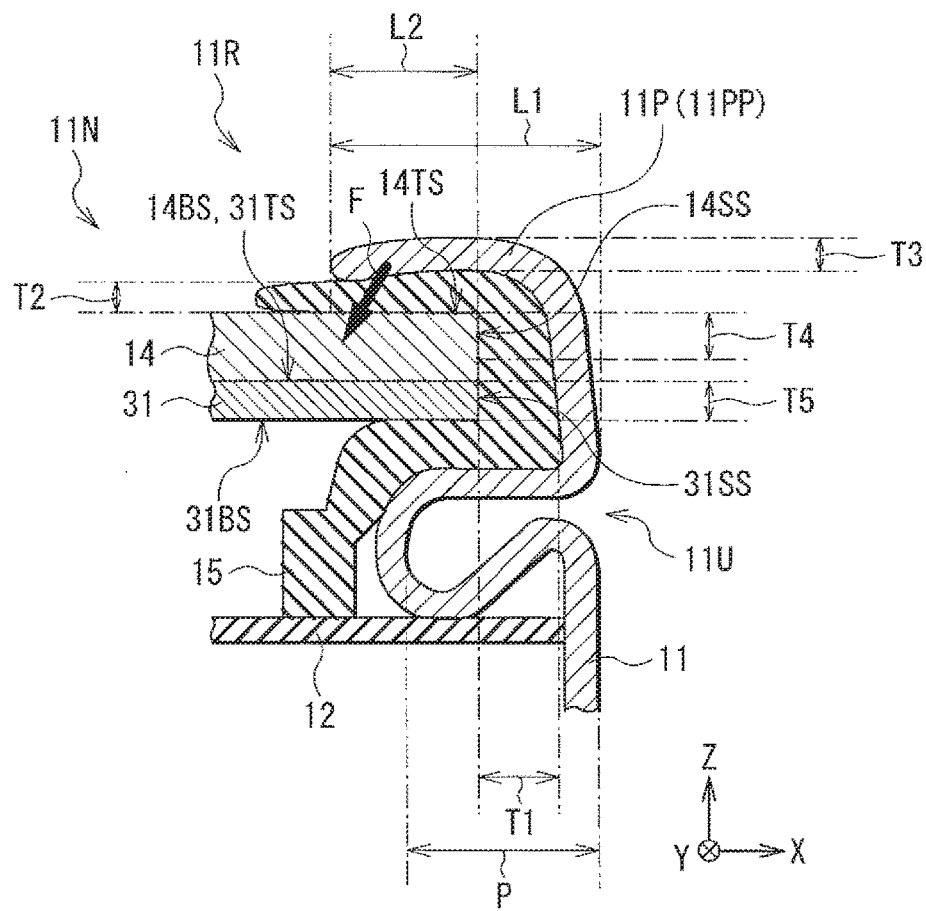
FIG. 3 is an enlarged cross-sectional view of a configuration of a crimped structure illustrated in FIG. 2.

FIG. 3 enlarges a cross-sectional configuration of the crimped structure 11R illustrated in FIG. 2. Hereinafter, FIGS. 1 and 2 will be referred to together with FIG. 3 as needed.

In this secondary battery, as described above, at the open end 11N of the battery can 11, the battery lid 14 and the safety valve mechanism 30 are crimped with the gasket 15, whereby the crimped structure 11R is formed.

Specifically, the battery can 11 has the bent portion 11P that defines the open end 11N. The bent portion 11P is a portion of the battery can 11 which is bent to have a predetermined bent shape described later in order to form the crimped structure 11R.

The battery lid 14 extends in the cross direction to close the open end 11N of the battery can 11. The battery lid 14 has a bottom surface 14BS facing the wound electrode body 20, a top surface 14TS opposite to the bottom surface 14BS, and a side surface 14SS connected to the bottom surface 14BS and the top surface 14TS.

In order to form the crimped structure 11R, the bent portion 11P is bent along each of the bottom surface 14BS, the side surface 14SS and the top surface 14TS in a state in which the gasket 15 is interposed between the bent portion 11P and the battery lid 14. Thus, the bent portion 11P includes a portion (specific bent portion 11PP) which is bent along each of the side surface 14SS and the top surface 14TS. The gasket 15 is, for example, bent along each of the bottom surface 14BS, the side surface 14SS, and the top surface 14TS, similarly to the bent portion 11P described above.

Consequently, a portion (tip portion) of the bent portion 11P is bent from the housing direction to the cross direction to be overlapped with the top surface 14TS of the battery lid 14 with the gasket 15 interposed therebetween.

On the other hand, another portion (root portion) of the bent portion 11P is bent from the housing direction to the cross direction to be overlapped with the bottom surface 14BS of the battery lid 14 with the gasket 15 interposed therebetween. As a result, since the root portion of the bent portion 11P is recessed toward the inside of the battery can 11, the battery can 11 is provided with a recess 11U. A depth P of the recess 11U is not particularly limited, and thus can be set arbitrarily.

Thus, a portion (bent portion 11P) of the battery can 11 in the open end 11N is bent to have the above-mentioned bent shape. In this case, the gasket 15 is pressed against the battery lid 14 by the bent portion 11P, and the bent portion 11P sandwiches the battery lid 14 from above and below with the gasket 15 interposed therebetween. Consequently, the gap between the bent portion 11P and the battery lid 14 is sealed by the gasket 15, and the battery lid 14 is fixed to the battery can 11 with the gasket 15 interposed therebetween. Thus, the crimped structure 11R is formed.

Herein, for example, as described above, since the safety valve mechanism 30 is provided to be mounted to the battery lid 14, the safety cover 31 is adjacent to the battery lid 14. Specifically, the central region of the battery lid 14 is, for example, spaced apart from the central region of the safety cover 31; however, the peripheral region of the battery lid 14 is, for example, adjacent to a peripheral region of the safety cover 31. The safety cover 31 is an "adjacent member" in an embodiment of the present technology.

For example, the safety cover 31 extends in the cross direction, similarly to the battery lid 14. For this reason, the safety cover 31 has, for example, a bottom surface 31BS facing the wound electrode body 20, a top surface 31TS opposite to the bottom surface 31BS, and a side surface 31SS connected to the bottom surface 31BS and the top surface 31TS. As described above, the peripheral region of the battery lid 14 is, for example, adjacent to the peripheral region of the safety cover 31; therefore, the bottom surface 14BS of the battery lid 14 is, for example, adjacent to the top surface 31TS of the safety cover 31.

In this case, the bent portion 11P is bent along each of the bottom surface 31BS, the side surface 31SS, the side surface 14SS and the top surface 14TS in a state in which the gasket 15 is interposed between the bent portion 11P and the battery lid 14 and between the bent portion 11P and the safety cover 31. Thus, the gasket 15 is, for example, bent along each of the bottom surface 31BS, the side surface 31SS, the side surface 14SS, and the top surface 14TS, similarly to the bent portion 11P described above.

From these facts, the gasket 15 is pressed against each of the battery lid 14 and the safety cover 31 by the bent portion 11P, and the bent portion 11P sandwiches the battery lid 14 and the safety cover 31 from above and below with the gasket 15 interposed therebetween. Consequently, the gap between the bent portion 11P and the battery lid 14 and between the bent portion lip and the safety cover 31 is sealed by the gasket 15, and the battery lid 14 and the safety cover 31 are fixed to the battery can 11 with the gasket 15 interposed therebetween.

The thickness of the gasket 15 is not particularly limited. In particular, the thickness of the gasket 15 is preferably gradually reduced in the direction from the side surface 14SS to the top surface 14TS. This is because the gap between the bent portion 11P and the battery lid 14 is easily sealed by the gasket 15 using the force (pressing force F) with which the gasket 15 is pressed against the battery lid 14 by the bent portion 11P.

Thus, a portion of the bent portion 11P facing the side surface 14SS may be, for example, inclined in accordance with the decrease in the thickness of the gasket 15 described above. That is, the portion of the bent portion 11P facing the side surface 14SS may, for example, gradually approach the battery lid 14 in the direction from the side surface 14SS to the top surface 14TS.

A position of a tip of the gasket 15 is not particularly limited. In particular, the tip of the gasket 15 preferably protrudes more than a tip of the bent portion 11P. This is because also in the vicinity of the tip of the bent portion 11P, the gap between the bent portion 11P and the battery lid 14 is easily sealed by the gasket 15 using the pressing force F described above.

A position of an upper end of the bent portion 11P is not particularly limited, but in particular it is preferable to be lower than a position of an upper end of the battery lid 14. That is, in the housing direction, the upper end of the bent portion 11P is preferably located closer to the wound electrode body 20 than the upper end of the battery lid 14. This is because, since a distance H is provided between the upper end of the bent portion 11P and the upper end of the battery lid 14, an installation space for an external tab is secured. This makes it easy to couple the external tab to the battery lid 14 functioning as a portion of the positive electrode 21.

In this secondary battery, in order to obtain excellent safety, configuration conditions regarding the crimped structure 11R are optimized. Hereinafter, FIGS. 2 and 3 will be referred to.

Specifically, the bending ratio R1 (%) defined by an outer diameter D1 (mm) of the battery can 11 defined by the bent portion 11P in the cross direction and a bending length L1 (mm) of the specific bent portion 11PP in the cross direction is 10% to 13%. The bending ratio R1 is calculated based on the equation: $R1=(L1/D1)\times 100$.

The "outer diameter D1" of the battery can 11 described here is a so-called maximum outer diameter. As described above, this is because, when the portion of the bent portion 11P facing the side surface 14SS is inclined in accordance with the decrease in the thickness of the gasket 15, an outer diameter of the battery lid 14 defined by the bent portion 11P can change depending on the place (measurement position).

The outer diameter D1 and the bending length L1 are not particularly limited as long as the bending ratio R1 satisfies the above-described suitable conditions. In particular, the outer diameter D1 is preferably 20 mm to 23 mm, and the bending length L1 is preferably 1.8 mm to 3 mm.

The bending ratio R1 satisfies the suitable conditions because the safety of the secondary battery is improved.

In detail, when the bending ratio R1 does not satisfy the suitable conditions, the gap between the bent portion 11P and the battery lid 14 is less likely to be sealed by the gasket 15.

Specifically, when the bending ratio R1 is less than 10%, the pressing force F is fundamentally insufficient because the bending length L1 is too small with respect to the outer diameter D1. Consequently, since a gap tends to be generated between the bent portion 11P and the battery lid 14, the gap is less likely to be sealed by the gasket 15.

On the other hand, when the bending ratio R1 is more than 13%, since the bending length L1 is too large with respect to the outer diameter D1, when the bent portion 11P is bent in a step of forming the crimped structure 11R, a tip portion of the bent portion 11P tends to have a wavy appearance. The "wavy appearance" is a phenomenon in which a portion near the tip of the bent portion 11P is deformed so as to be wavy. In this case, although the bending length L1 is sufficiently large with respect to the outer diameter D1, the pressing force F is reduced near the tip of the bent portion 11P. Consequently, since a gap tends to be generated between the bent portion 11P and the battery lid 14 due to an external force such as an impact when the secondary battery is dropped, the gap is less likely to be sealed by the gasket 15.

On the other hand, when the bending ratio R1 is 10% to 13%, the bending length L1 is optimized with respect to the outer diameter D1, so that the pressing force F is secured and the tip portion of the bent portion 11P is less likely to have a wavy appearance. Consequently, since a gap is less likely to be generated between the bent portion 11P and the battery lid 14, the gap is easily sealed by the gasket 15. Thus, sealing strength of the crimped structure 11R is improved, so that an effective operation of the safety valve mechanism 30 can be secured. That is, the safety valve mechanism 30 can operate only when the internal pressure of the battery can 11 reaches a sufficiently high level.

From these facts, when the bending ratio R1 satisfies the suitable conditions, the effective operation of the safety valve mechanism 30 is secured, and therefore, the safety of the secondary battery is improved.

In particular, when the diameter of the cylindrical secondary battery is increased, that is, when the outer diameter D1 of the battery can 11 is increased, if the bending ratio R1 satisfies the suitable conditions, the safety of the secondary battery effectively improves. This is because the battery lid 14 is easily fixed to the battery can 11 even when the battery can 11 increases in size. When the battery can 11 increases in size, an example of the outer diameter D1 is as described above.

In addition to the bending ratio R1 described above, for example, a series of configuration conditions described below may be optimized.

Specifically, an overlap ratio R2 (%) defined by an outer diameter D2 (mm) of the battery lid 14 in the cross direction and an overlap length L2 (mm) in the cross direction of a region where the specific bent portion 11PP and the battery lid 14 overlap with each other in the housing direction is not particularly limited, and is, for example, 6% to 9%. The overlap ratio R2 is calculated based on the equation: $R2=(L2/D2)\times 100$.

The outer diameter D2 and the overlap length L2 are not particularly limited as long as the overlap ratio R2 satisfies the above-described suitable conditions. In particular, the outer diameter D2 is preferably 17.5 mm to 19.5 mm, and the overlap length L2 is preferably 1.1 mm to 2.5 mm.

The bending ratio R1 and the overlap ratio R2 satisfy the suitable conditions because the safety of the secondary battery is further improved.

In detail, when the overlap ratio R2 does not satisfy the suitable conditions, the battery lid 14 is less likely to be fixed to the battery can 11.

Specifically, when the overlap ratio R2 is less than 6%, the overlap length L2 is too small with respect to the outer diameter D2, so that the bent portion 11P is fundamentally less likely to hold the battery lid 14 with the gasket 15 interposed therebetween. Consequently, since the battery lid 14 is less likely to be fixed to the battery can 11, the battery lid 14 tends to detach from the battery can 11 due to an external force such as an impact when the secondary battery is dropped, and at the same time, an electrolytic solution tends to flow out (leak) from the inside of the battery can 11.

On the other hand, when the overlap ratio R2 is more than 9%, since the overlap length L2 is too large with respect to the outer diameter D2, the tip portion of the bent portion 11P tends to have a wavy appearance as in the case where the bending ratio R1 is more than 13%. In this case, even though the overlap length L2 is sufficiently large with respect to the outer diameter D2, the bent portion 11P is substantially less likely to hold the battery lid 14 with the gasket 15 interposed therebetween. Consequently, since the battery lid 14 is less likely to be fixed to the battery can 11, the battery lid 14 tends to detach, and at the same time, the electrolytic solution tends to leak.

On the other hand, when the overlap ratio R2 is 6% to 9%, the overlap length L2 is optimized with respect to the outer diameter D2, so that the bent portion 11P can easily hold the battery lid 14 with the gasket 15 interposed therebetween and the tip portion of the bent portion 11P is less likely to have a wavy appearance. Consequently, since the battery lid 14 is easily fixed to the battery can 11, the battery lid 14 is less likely to detach, and at the same time, the electrolytic solution is less likely to leak.

From these facts, when the bending ratio R1 satisfies the suitable conditions and the overlap ratio R2 also satisfies the suitable conditions, the effective operation of the safety valve mechanism 30 is secured while suppressing detachment of the battery lid 14 and leakage of the electrolytic solution, and therefore, the safety of the secondary battery is further improved.

In particular, as described above, when the diameter of the cylindrical secondary battery is increased, if the bending ratio R1 satisfies the suitable conditions and the overlap ratio R2 also satisfies the suitable conditions, the battery lid 14 can be more easily fixed to the battery can 11, so that the safety of the secondary battery is further improved.

When the thickness of the gasket 15 is gradually reduced and the safety cover 31 is adjacent to the battery lid 14, a thickness difference DT (mm) defined by a thickness T1 (mm) of the gasket 15 at a position corresponding to the bottom surface 31BS of the safety cover 31 and a thickness T2 (mm) of the gasket 15 at a position corresponding to the tip of the bent portion 11P is not particularly limited, and is, for example, 0.1 mm to 0.3 mm. The thickness difference DT is calculated based on the equation: $DT=T1-T2$.

As long as the thickness difference DT satisfies the above-described suitable conditions, each of the thicknesses T1 and T2 is not particularly limited. In particular, the thickness T1 is, for example, 0.4 mm to 0.8 mm, and the thickness T2 is, for example, 0.2 mm to 0.6 mm.

The thickness difference DT satisfies the suitable conditions because it is easy to couple the external tab to the battery lid 14 while securing the safety of the secondary battery.

Specifically, for example, when the thickness T1 is constant, if the thickness difference DT is less than 0.1 μm, the thickness of a portion near a tip of the gasket 15 is too large, so that the distance H is significantly reduced. Consequently, a space for coupling the external tab to the battery lid 14 is insufficient, so that it may become difficult to couple the external tab to the battery lid 14.

On the other hand, for example, when the thickness T1 is constant, if the thickness difference DT is more than 0.3 μm, the thickness of the portion near the tip of the gasket 15 is too small, so that the portion near the tip tends to be broken due to an external force. Consequently, the battery lid 14 may tend to detach due to the external force, and at the same time, the electrolytic solution may tend to leak.

A thickness T3 (mm) of the specific bent portion 11PP is not particularly limited, and is, for example, 0.27 mm to 0.31 mm. This is because since the size of the wound electrode body 20 (positive electrode 21 and negative electrode 22) becomes sufficiently large, the external tab is easily connected to the battery lid 14 while securing battery capacity.

Specifically, for example, when the thickness T3 is less than 0.27 μm, physical strength of the bent portion 11P is insufficient, so that while the bent portion 11P is less likely to hold the battery lid 14 with the gasket 15 interposed therebetween, the bent portion 11P tends to be deformed. Consequently, when the internal pressure of the battery can 11 increases, the battery lid 14 may tend to detach, and at the same time, the electrolytic solution may tend to leak.

On the other hand, for example, when the thickness T3 is more than 0.31 mm, if the dimension (height) of the battery can 11 in the longitudinal direction (housing direction) is constant, the occupied volume of the wound electrode body 20 inside the battery can 11 relatively decreases, and therefore, a charge/discharge area decreases. The "charge/discharge area" is an area of a region capable of performing a charge/discharge reaction, and is a so-called area of a region where the positive electrode 21 and the negative electrode 22 face each other. Consequently, since a charge amount and a discharge amount are each reduced, the battery capacity may tend to be reduced.

A total thickness TT (mm) defined by a thickness T4 (mm) of the battery lid 14 and a thickness T5 (mm) of the safety cover 31 is not particularly limited, and is, for example, 0.8 mm to 1 mm. The total thickness TT is calculated based on the equation: TT=T4+T5.

As long as the total thickness TT satisfies the above-described suitable conditions, each of the thicknesses T4 and T5 is not particularly limited. In particular, the thickness T4 is, for example, 0.2 mm to 0.7 mm, and the thickness T5 is, for example, 0.2 mm to 0.6 mm.

The total thickness TT satisfies the suitable conditions because it is easy to couple the external tab to the battery lid 14 while securing the battery capacity.

Specifically, when the total thickness TT is less than 0.8 mm, physical durability of the battery lid 14 or the like closing the battery can 11 is reduced, so that the battery lid 14 and the like tend to be deformed due to an increase in the internal pressure of the battery can 11. Consequently, when the internal pressure of the battery can 11 increases, the battery lid 14 may tend to detach, and at the same time, the electrolytic solution may tend to leak.

On the other hand, when the total thickness TT is more than 1 mm, if the dimension (height) of the battery can 11 in the longitudinal direction is constant, the occupied volume of the wound electrode body 20 inside the battery can 11 relatively decreases, and therefore, the battery capacity may be reduced.

Subsequently, a configuration of the wound electrode body 20 will be described.

Figure 4:
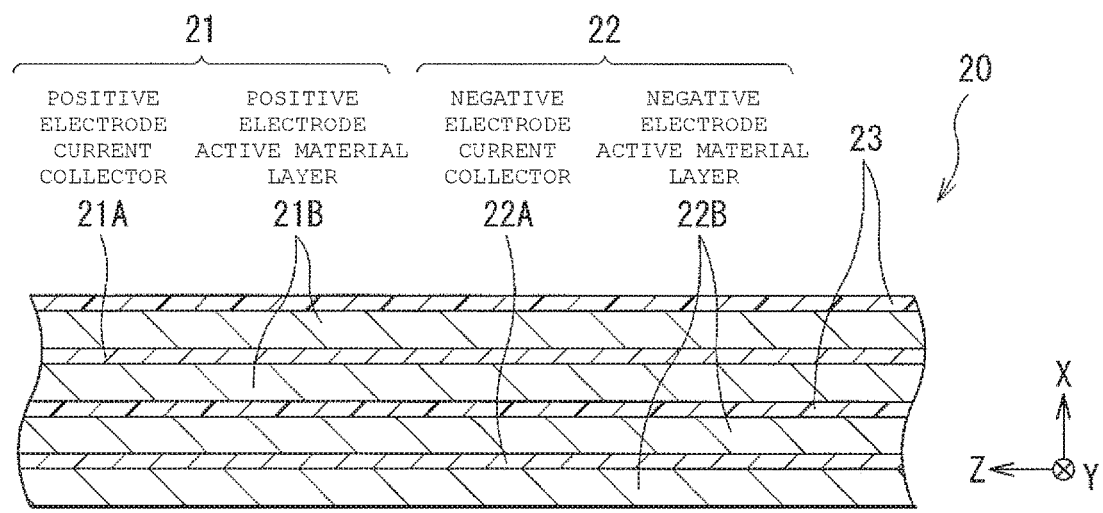
FIG. 4 is a partially enlarged cross-sectional view of a wound electrode body 20 illustrated in FIG. 1.

FIG. 4 enlarges a portion of a cross-sectional configuration of the wound electrode body 20 illustrated in FIG. 1. As described above, the wound electrode body 20 includes the positive electrode 21, the negative electrode 22, the separator 23, and the electrolytic solution.

As illustrated in FIG. 4, the positive electrode 21 includes, for example, a positive electrode current collector 21A and a positive electrode active material layer 21B provided on both surfaces of the positive electrode current collector 21A. However, the positive electrode active material layer 21B may be provided on only one surface of the positive electrode current collector 21A.

The positive electrode current collector 21A contains, for example, one or more of conductive materials. The kind of the conductive material is not particularly limited, however, examples of the conductive material include metal materials such as aluminum, nickel, and stainless steel. The positive electrode current collector 21A may be configured of a single layer, or may be configured of multiple layers.

The positive electrode active material layer 21B includes one or more of positive electrode materials capable of inserting and extracting lithium as a positive electrode active material. However, the positive electrode active material layer 21B may further contain one or more of other materials such as a positive electrode binder and a positive electrode conductive agent.

The positive electrode material is preferably a lithium-containing compound, and more specifically preferably a lithium-containing composite oxide, a lithium-containing phosphate compound and the like. This is because a high energy density can be obtained.

The lithium-containing composite oxide is an oxide containing lithium and one or more of other elements (elements other than lithium) as constituent elements, and has, for example, one of crystal structures such as a layered rock-salt type crystal structure and a spinel crystal structure. The lithium-containing phosphate compound is a phosphate compound that contains lithium and one or more of the other elements as constituent elements, and has, for example, a crystal structure such as an olivine crystal structure.

The kind of the other element is not particularly limited as long as the other element is one or more of arbitrary elements. In particular, the other elements are preferably one or more of elements that belong to Groups 2 to 15 in the long-periodic table. More specifically, the other elements more preferably include one or more of metal elements of nickel, cobalt, manganese, and iron. This is because a high voltage can be obtained.

Examples of the lithium-containing composite oxide having the layered rock-salt type crystal structure include one or more of compounds represented by the following respective formulas (1) to (3).

$$Li_aMn_{(1-b-c)}Ni_bM11_cO_{(2-d)}Fe \qquad (1)$$

(where M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). "a" to "e" satisfy 0.8≤a≤1.2, 0<b<0.5, 0≤c≤0.5, (b+c)<1, −0.1≤d≤0.2, and 0≤e≤0.1. It is to be noted that the composition of lithium varies depending on charge and discharge states, and "a" is a value in a completely-discharged state.)

$$Li_aNi_{(1-b)}M12_bO_{(2-c)}F_d \qquad (2)$$

(where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). "a" to "d" satisfy 0.8≤a≤1.2, 0.005≤b≤0.5, −0.1≤c≤0.2, and 0≤d≤0.1. It is to be noted that the composition of lithium varies depending on charge and discharge states, and "a" is a value in a completely-discharged state.)

$$Li_aCo_{(1-b)}M13_bO_{(2-c)}F_d \qquad (3)$$

(where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). "a" to "d" satisfy 0.8≤a≤1.2, 0≤b≤0.5, −0.1≤c≤0.2, and 0≤d≤0.1. It is to be noted that the composition of lithium varies depending on charge and discharge states, and "a" is a value in a completely-discharged state.)

Specific examples of the lithium-containing composite oxide having the layered rock-salt type crystal structure include LiNiO$_2$, LiCoO$_2$, LiCo$_{0.98}$Al$_{0.01}$Mg$_{0.01}$O$_2$, LiNi$_{0.5}$Co$_{0.2}$Mn$_{0.3}$O$_2$, LiNi$_{0.8}$Co$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.175}$Ni$_{0.1}$O$_2$, and Li$_{1.15}$(Mn$_{0.65}$Ni$_{0.22}$Co$_{0.13}$)O$_2$.

In the case where the lithium-containing composite oxide having the layered rock-salt type crystal structure contains, as constituent elements, nickel, cobalt, manganese, and aluminum, an atomic ratio of nickel is preferably not less than 50 at %. This is because a high energy density can be obtained.

Examples of the lithium-containing composite oxide having the spinel type crystal structure include compounds represented by the following formula (4).

$$Li_aMn_{(2-b)}M14_bO_cF_d \qquad (4)$$

(where M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). "a" to "d" satisfy 0.9≤a≤1.1, 0≤b≤0.6, 3.7≤c≤4.1, and 0≤d≤0.1. It is to be noted that the composition of lithium varies depending on charge and discharge states, and "a" is a value in a completely-discharged state.)

Specific examples of the lithium-containing composite oxide having the spinel type crystal structure include LiMn$_2$O$_4$.

Examples of the lithium-containing phosphate compound having the olivine type crystal structure include compounds represented by the following formula (5).

$$Li_aM15PO_4 \qquad (5)$$

(where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). "a" satisfies 0.9≤a≤1.1. It is to be noted that the composition of lithium varies depending on charge and discharge states, and "a" is a value in a completely-discharged state.)

Specific examples of the lithium-containing phosphate compound having the olivine type crystal structure include LiFePO$_4$, LiMnPO$_4$, LiFe$_{0.5}$Mn$_{0.5}$PO$_4$, and LiFe$_{0.3}$Mn$_{0.7}$PO$_4$.

The lithium-containing composite oxide may be, for example, a compound represented by the following formula (6).

$$(Li_2MnO_3)_x(LiMnO_2)_{1-x} \qquad (6)$$

(x satisfies 0≤x≤1. It is to be noted that the composition of lithium varies depending on charge and discharge states, and "x" is a value in a completely-discharged state.)

In addition, the positive electrode material may be, for example, one or more of an oxide, a disulfide, a chalcogenide, a conductive polymer and the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene. However, the positive electrode material may be any material other than the materials described above.

The positive electrode binder contains, for example, one or more of synthetic rubber, polymer compounds, and the like. Examples of the synthetic rubber include styrene-butadiene-based rubber, fluororubber, and ethylene propylene diene. Examples of the polymer compounds include polyvinylidene fluoride and polyimide.

The positive electrode conductive agent contains, for example, one or more of carbon materials and the like. Examples of the carbon materials include graphite, carbon black, acetylene black, and Ketjen black. The positive electrode conductive agent may be a metal material, a conductive polymer, or the like as long as the positive electrode conductive agent has electric conductivity.

As illustrated in FIG. 4, the negative electrode 22 includes, for example, a negative electrode current collector 22A and a negative electrode active material layer 22B provided on both surfaces of the negative electrode current collector 22A. However, the negative electrode active material layer 22B may be provided on only one surface of the negative electrode current collector 22A.

The negative electrode current collector 22A contains, for example, one or more of conductive materials. The kind of the conductive material is not particularly limited; however, examples of the conductive material include metal materials such as copper, aluminum, nickel, and stainless steel. The negative electrode current collector 22A may be configured of a single layer, or may be configured of multiple layers.

A surface of the negative electrode current collector 22A may be preferably roughened. This makes it possible to improve close-contact characteristics of the negative electrode active material layer 22B with respect to the negative electrode current collector 22A by a so-called anchor effect. In this case, it is enough that the surface of the negative electrode current collector 22A at least in a region facing the negative electrode active material layer 22B is roughened. Examples of the roughening method include a method of forming fine particles by utilizing electrolytic treatment. Through the electrolytic treatment, fine particles are formed on the surface of the negative electrode current collector 22A in an electrolytic bath by an electrolytic method to make the surface of the negative electrode current collector 22A rough. A copper foil fabricated by an electrolytic method is generally called "electrolytic copper foil."

The negative electrode active material layer 22B contains one or more of negative electrode materials capable of inserting and extracting lithium as a negative electrode active material. However, the negative electrode active material layer 22B may further contain one or more of materials such as a negative electrode binder and a negative electrode conductive agent.

The chargeable capacity of the negative electrode material is preferably larger than the discharge capacity of the positive electrode 21 for the purpose of preventing lithium metal from being unintentionally precipitated on the negative electrode 22 during charging. That is, the electrochemical equivalent of the negative electrode material capable of inserting and extracting lithium is preferably larger than the electrochemical equivalent of the positive electrode 21.

The negative electrode material is, for example, a carbon material. The carbon material causes an extremely small change in a crystal structure thereof when lithium is inserted or extracted, which stably achieves high energy density. Further, the carbon material also serves as the negative electrode conductive agent, which improves conductivity of the negative electrode active material layer 22B.

Examples of the carbon material include graphitizable carbon, non-graphitizable carbon, and graphite. It is to be noted that a spacing of (002) plane in the non-graphitizable carbon is preferably not less than 0.37 nm, and a spacing of (002) plane in the graphite is preferably not more than 0.34 nm. More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is obtained by firing (carbonizing) a polymer compound such as phenol resin and furan resin at appropriate temperature. Other than the materials mentioned above, the carbon material may be low crystalline carbon subjected to a heat treatment at temperature of about 1000° C. or lower, or may be amorphous carbon. The shape of the carbon material may be any of a fibrous shape, a spherical shape, a granular shape, and a scale-like shape.

The negative electrode material is, for example, a metal-based material. The "metal-based material" is a generic name of a material containing one or more of metal elements and metalloid elements as constituent elements. This is because a high energy density can be obtained.

The metal-based material may be a simple substance, an alloy, or a compound, may be two or more thereof, or may have one or more phases thereof in part or all thereof. It is to be noted that the alloy also encompasses a material that contains one or more metal elements and one or more metalloid elements, in addition to a material configured of two or more metal elements. Further, the alloy may contain a non-metallic element. Examples of the structure of the metal-based material include a solid solution, a eutectic crystal (a eutectic mixture), an intermetallic compound, and a structure in which two or more thereof coexist.

The metal elements and the metalloid elements described above are, for example, one or more of metal elements and metalloid elements that are able to form an alloy with lithium. Specific examples thereof include magnesium, boron, aluminum, gallium, indium, silicon, germanium, tin, lead, bismuth, cadmium, silver, zinc, hafnium, zirconium, yttrium, palladium, and platinum.

In particular, silicon or tin or both is preferable. The reason for this is that silicon and tin have a superior ability of inserting and extracting lithium, and therefore provide significantly high energy density.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The "simple substance" described herein merely refers to a simple substance in a general sense (in which a small amount of impurity may be contained), and does not necessarily refer to a simple substance having a purity of 100%.

The alloy of silicon contains, for example, one or more of elements such as tin, nickel, copper, iron, cobalt, manganese, zinc, indium, silver, titanium, germanium, bismuth, antimony, and chromium, as constituent elements other than silicon. The compound of silicon contains, for example, one or more of elements such as carbon and oxygen as constituent elements other than silicon. The compound of silicon contains, for example, one or more of the elements described related to the alloy of silicon, as constituent elements other than silicon.

Specific examples of each of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$, ($0<v≤2$), and $LiSiO$. v in $SiO_v$ may be $0.2<v<1.4$.

The alloy of tin contains, for example, one or more of elements such as silicon, nickel, copper, iron, cobalt, manganese, zinc, indium, silver, titanium, germanium, bismuth, antimony, and chromium, as constituent elements other than tin. The compound of tin contains, for example, one or more of elements such as carbon and oxygen as constituent elements other than tin. The compound of tin contains, for example, one or more of the elements described related to the alloy of tin, as constituent elements other than tin.

Specific examples of the alloy of tin and the compound of tin include $SnO_w$ ($0<w≤2$), $SnSiO_3$, $LiSnO$, and $Mg_2Sn$.

In particular, the material containing tin as a constituent element is preferably, for example, a material (Sn-containing material) that contains, together with tin as a first constituent element, a second constituent element and a third constituent element. The second constituent element includes, for example, one or more of elements such as cobalt, iron, magnesium, titanium, vanadium, chromium, manganese, nickel, copper, zinc, gallium, zirconium, niobium, molybdenum, silver, indium, cesium, hafnium (Hf), tantalum, tungsten, bismuth, and silicon. The third constituent element includes, for example, one or more of elements such as boron, carbon, aluminum, and phosphorus. This is because the Sn-containing material containing the second constituent element and the third constituent element makes it possible to achieve, for example, high battery capacity and superior cycle characteristics.

In particular, the Sn-containing material is preferably a material (a SnCoC-containing material) that contains tin, cobalt, and carbon as constituent elements. In the SnCoC-containing material, for example, a content of carbon is from 9.9% by mass to 29.7% by mass, and a ratio of contents of tin and cobalt (Co/(Sn+Co)) is from 20% by mass to 70% by mass. This is because a high energy density can be obtained.

The SnCoC-containing material has a phase that contains tin, cobalt, and carbon, and the phase is preferably low crystalline or amorphous. The phase is a reaction phase capable of reacting with lithium, and therefore existence of the reaction phase results in achievement of superior characteristics. A half width (a diffraction angle 2θ) of a diffraction peak obtained by X-ray diffraction of this reaction phase may be preferably 1° or larger in the case where a CuKα ray is used as a specific X-ray, and an insertion rate is 1°/min. This makes it possible to insert and extract lithium more smoothly, and to decrease reactivity with the electrolytic solution. In some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of 2θ=20° to 50°. Such a reaction phase includes, for example, the respective constituent elements described above, and it is considered that such a reaction phase has become low crystalline or amorphous mainly because of existence of carbon.

In the SnCoC-containing material, part or all of carbon that is the constituent element thereof is preferably bound to a metal element or a metalloid element that is another constituent element thereof. This is because cohesion or crystallization of, for example, tin is suppressed. It is possible to confirm a binding state of the elements, for example, by an X-ray photoelectron spectroscopy method (XPS). In a commercially available device, for example, an Al-Kα ray or a Mg-Kα ray is used as a soft X-ray. In the case where part or all of carbon are bound to a metal element, a metalloid element, or the like, the peak of a synthetic wave of is orbit of carbon (C1s) appears in a region lower than 284.5 eV. It is assumed that energy calibration is made so that the peak of 4f orbit of a gold atom (Au4f) is obtained at 84.0 eV. At this time, in general, since surface contamination carbon exists on the material surface, the peak of C1s of the surface contamination carbon is regarded as 284.8 eV, and this peak is used as energy standard. In XPS measurement, the waveform of the peak of C1s is obtained as a form including the peak of the surface contamination carbon and the peak of carbon in the SnCoC-containing material. The two peaks may be therefore separated from each other, for example, by analysis with use of commercially available software. In the analysis of the waveform, the position of the main peak existing on the lowest bound energy side is set to the energy reference (284.8 eV).

The SnCoC-containing material is not limited to the material (SnCoC) that contains only tin, cobalt, and carbon as constituent elements. The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements is also preferable. Any composition of the SnCoFeC-containing material may be adopted. To give an example, in the case where a content of iron is set smaller, a content of carbon is from 9.9% by mass to 29.7% by mass, a content of iron is from 0.3% by mass to 5.9% by mass, and a ratio of contents of tin and cobalt (Co/(Sn+Co)) is from 30% by mass to 70% by mass. Alternatively, in the case where the content of iron is set larger, the content of carbon is from 11.9% by mass to 29.7% by mass, the ratio of contents of tin, cobalt, and iron ((Co+Fe)/(Sn+Co+Fe)) is from 26.4% by mass to 48.5% by mass, and the ratio of contents of cobalt and iron (Co/(Co+Fe)) is from 9.9% by mass to 79.5% by mass. Such composition ranges allow achievement of high energy density. Physical characteristics (such as a half width) of the SnCoFeC-containing material are similar to physical characteristics of the foregoing SnCoC-containing material.

Other than the materials mentioned above, the negative electrode material may be, for example, one or more of a metal oxide, a polymer compound, and the like. Examples of the metal oxide include iron oxide, ruthenium oxide, and molybdenum oxide. Examples of the polymer compound include polyacetylene, polyaniline, and polypyrrole.

In particular, the negative electrode material preferably contains both the carbon material and the metal-based material for the following reasons.

The metal-based material, in particular, the material containing one or both of silicon and tin as constituent elements has a concern that such a material is easily and radically expanded or contracted at the time of charge and discharge, whereas such a material has an advantage of high theoretical capacity. In contrast, the carbon material has an advantage that the carbon material is less prone to be expanded or contracted at the time of charge and discharge, whereas the carbon material has a concern of low theoretical capacity. Accordingly, using both the carbon material and the metal-based material makes it possible to suppress expansion and contraction during charging and discharging while achieving high theoretical capacity (in other words, high battery capacity).

The negative electrode active material layer 22B is formed by, for example, one or more of a coating method, a gas phase method, a liquid phase method, a thermal spraying method, and a firing method (sintering method). The coating method is a method in which, for example, after a particulate (powder) negative electrode active material is mixed with a negative electrode binder and the like, the mixture is dispersed in an organic solvent or the like, and then the negative electrode current collector 22A is coated with the resultant. Examples of the gas phase method include a physical deposition method and a chemical deposition method. More specifically, examples thereof include vacuum evaporation method, sputtering method, ion plating method, laser ablation method, thermal chemical vapor deposition method, chemical vapor deposition (CVD) method, and plasma chemical vapor deposition method. Examples of the liquid phase method include electrolytic plating method and electroless plating method. The thermal spraying method is a method in which a negative electrode active material in a fused state or a semi-fused state is sprayed onto the negative electrode current collector 22A. The firing method is, for example, a method in which after the negative electrode current collector 22A is coated with the mixture dispersed in the organic solvent or the like by the coating method, the mixture is subjected to heat treatment at a temperature higher than the melting point of the negative electrode binder or the like. As the firing method, for example, an atmosphere firing method, a reactive firing method, a hot press firing method, and the like can be used.

In the secondary battery, as described above, the electrochemical equivalent of the negative electrode material capable of inserting and extracting lithium is larger than the electrochemical equivalent of the positive electrode for the purpose of preventing lithium from being unintentionally precipitated on the negative electrode 22 during charging. Further, in the case where an open circuit voltage (that is, a battery voltage) in a completely-charged state is not less than 4.25 V, an extraction amount of lithium per unit mass is larger than that in the case where the open circuit voltage in the completely-charged state is 4.20 V, even if the same positive electrode active material is used, and therefore, amounts of the positive electrode active material and the negative electrode active material are adjusted in accordance therewith. Accordingly, high energy density is obtained.

For example, as illustrated in FIG. 4, the separator 23 is interposed between the positive electrode 21 and the negative electrode 22, and passes lithium ions therethrough while preventing current short circuit resulting from contact of the positive electrode 21 and the negative electrode 22.

The separator 23 contains, for example, one or more of porous films made of synthetic resin, ceramics, or the like. The separator 23 may be a laminated film in which two or more porous films are stacked. Examples of the synthetic resin include polytetrafluoroethylene, polypropylene, and polyethylene.

In particular, the separator 23 may include, for example, the foregoing porous film (base material layer) and a polymer compound layer provided on a single surface or both surfaces of the base material layer. The reason for this is that, this allows an improvement in close-contact characteristics of the separator 23 with respect to each of the positive electrode 21 and the negative electrode 22, thereby suppressing distortion of the wound electrode body 20. This makes it possible to suppress decomposition reaction of the electrolytic solution and to suppress liquid leakage of the electrolytic solution with which the base material layer is impregnated. Accordingly, resistance is less prone to increase even if charge and discharge are repeated, and battery swollenness is suppressed.

The polymer compound layer includes, for example, a polymer compound such as polyvinylidene fluoride. This is because polyvinylidene fluoride has superior physical strength and is electrochemically stable. However, the polymer compound may be other than polyvinylidene fluoride. When the polymer compound layer is formed, for example, the base material layer is coated with a solution prepared by dissolving the polymer compound in, for example, an organic solvent, and thereafter, the base material layer is dried. Alternatively, the base material layer may be immersed in the solution, and thereafter the base material layer may be dried. The polymer compound layer may contain, for example, one or more of insulating particles such as inorganic particles. The types of inorganic particles are, for example, aluminum oxide and aluminum nitride.

The electrolytic solution contains a solvent and an electrolyte salt. However, the electrolytic solution may further contain one or more of other materials such as additives.

The solvent contains one or more of nonaqueous solvents such as organic solvents. The electrolytic solution containing the nonaqueous solvent is a so-called nonaqueous electrolytic solution.

Examples of the nonaqueous solvent include a cyclic carbonate ester, a chain carbonate ester, lactone, a chain carboxylic ester, and nitrile (mononitrile). The nonaqueous solvents make it possible to achieve, for example, superior battery capacity, superior cycle characteristics, and superior storage characteristics.

Examples of the cyclic carbonate ester include ethylene carbonate, propylene carbonate, and butylene carbonate. Examples of the chain carbonate ester include dimethyl carbonate, diethyl carbonate, ethylmethyl carbonate, and methylpropyl carbonate. Examples of the lactone include γ-butyrolactone and γ-valerolactone. Examples of the chain carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, methoxyacetonitrile, and β-methoxypropionitrile.

Other than the materials mentioned above, examples of the nonaqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. These nonaqueous solvents make it possible to achieve similar advantages.

In particular, the nonaqueous solvent preferably contains one or more of ethylene carbonate, propylene carbonate, dimethyl carbonate, diethyl carbonate, ethyl methyl carbonate and the like. The nonaqueous solvents make it possible to achieve, for example, high battery capacity, excellent cycle characteristics, and excellent storage characteristics. In this case, a combination of a high-viscosity (high dielectric constant) solvent (having, for example, relative permittivity $\varepsilon \geq 30$) such as ethylene carbonate and propylene carbonate and a low-viscosity solvent (having, for example, viscosity≤1 mPa·s) such as dimethyl carbonate, ethylmethyl carbonate, and diethyl carbonate is more preferable. The combination makes it possible to improve the dissociation property of the electrolyte salt and ion mobility.

In particular, the nonaqueous solvent may contain one or more of an unsaturated cyclic carbonate ester, a halogenated carbonate ester, a sulfonate ester, an acid anhydride, a dicyano compound (dinitrile compound), a diisocyanate compound, a phosphoric ester, a chain compound having a carbon-carbon triple bond, and the like. This makes it possible to improve the chemical stability of the electrolytic solution.

The unsaturated cyclic carbonate ester is a cyclic carbonate ester including one or more unsaturated bonds (carbon-carbon double bonds or carbon-carbon triple bonds). Examples of the unsaturated cyclic carbonate ester include vinylene carbonate, vinyl ethylene carbonate, and methylene ethylene carbonate. A content of the unsaturated cyclic carbonate ester in the nonaqueous solvent is not particularly limited; however, the content is, for example, from 0.01% by weight to 10% by weight.

The halogenated carbonate ester is a cyclic carbonate ester having one or more halogens as constituent elements or a chain carbonate ester having one or more halogens as constituent elements. When the halogenated carbonate ester contains two or more halogens as constituent elements, the number of types of these two or more halogens may be one or not less than two. Examples of the cyclic halogenated carbonate ester include 4-fluoro-1,3-dioxolan-2-one and 4,5-difluoro-1,3-dioxolan-2-one. Examples of the chain halogenated carbonate ester include fluoromethyl methyl carbonate, bis(fluoromethyl) carbonate, and difluoromethyl methyl carbonate. A content of the halogenated carbonate ester in the nonaqueous solvent is not particularly limited; however, the content is, for example, from 0.01% by weight to 50% by weight.

Examples of the sulfonate ester include a monosulfonate ester and a disulfonate ester. A content of the sulfonate ester in the nonaqueous solvent is not particularly limited; however, the content is, for example, from 0.01% by weight to 10% by weight.

The monosulfonate ester may be a cyclic monosulfonate ester or a chain monosulfonate ester. Examples of the cyclic monosulfonate ester include sultones such as 1,3-propane sultone and 1,3-propene sultone. Examples of the chain monosulfonate ester include a compound in which a cyclic monosulfonate ester is cleaved at a middle site. The disulfonate ester may be a cyclic disulfonate ester or a chain disulfonate ester.

Examples of the acid anhydride include carboxylic anhydride, disulfonic anhydride, and carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of the carboxylic-sulfonic anhydride include sulfobenzoic anhydride, sulfopropionic anhydride, and sulfobutyric anhydride. A content of the acid anhydride in the nonaqueous solvent is not particularly limited; however, the content is, for example, from 0.5% by weight to 5% by weight.

Examples of the dinitrile compound include a compound represented by $NC-C_mH_{2m}-CN$ (m is an integer of not less than 1). Examples of the dinitrile compound include succinonitrile ($NC-C_2H_4-CN$), glutaronitrile ($NC-C_3H_6-CN$), adiponitrile ($NC-C_4H_8-CN$), and phthalonitrile ($NC-C_6H_4-CN$). A content of the dinitrile compound in the nonaqueous solvent is not particularly limited; however, the content is, for example, from 0.5% by weight to 5% by weight.

Examples of the diisocyanate compound include a compound represented by $OCN-C_nH_{2n}-NCO$ (n is an integer of not less than 1). Examples of the diisocyanate compound include hexamethylene diisocyanate ($OCN-C_6H_{12}-NCO$). A content of the diisocyanate compound in the nonaqueous solvent is not particularly limited; however, the content is, for example, from 0.5% by weight to 5% by weight.

Examples of the phosphoric ester include trimethyl phosphate and triethyl phosphate. A content of the phosphoric ester in the nonaqueous solvent is not particularly limited; however, the content is, for example, from 0.5% by weight to 5% by weight.

The chain compound having a carbon-carbon triple bond is a chain compound having one or more carbon-carbon triple bonds ($-C\equiv C-$). Examples of the chain compound having a carbon-carbon triple bond include propargyl methyl carbonate ($CH-C-CH_2-O-C(=O)-O-CH_3$) and propargyl methyl sulfonate ($CH\equiv C-CH_2-O-S(=O)_2-CH_3$). A content of the chain compound having the carbon-carbon triple bond in the nonaqueous solvent is not particularly limited; however, the content is, for example, from 0.5% by weight to 5% by weight.

The electrolyte salt contains, for example, one or more of salts such as lithium salts. However, the electrolyte salt may contain a salt other than the lithium salt. Examples of the salt other than the lithium salt include a light metal salt other than lithium.

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). The nonaqueous solvents make it possible to achieve, for example, superior battery capacity, superior cycle characteristics, and superior storage characteristics.

In particular, one or more of lithium hexafluorophosphate, lithium tetrafluoroborate, lithium perchlorate, and lithium hexafluoroarsenate are preferable, and lithium hexafluorophosphate is more preferable. These lithium salts make it possible to lower internal resistance, thereby achieving a higher effect.

A content of the electrolyte salt is not particularly limited; however, the content is preferably from 0.3 mol/kg to 3 mol/kg with respect to the solvent. High ion conductivity is achievable in this range.

Subsequently, operation of the secondary battery will be described.

Figure 5:
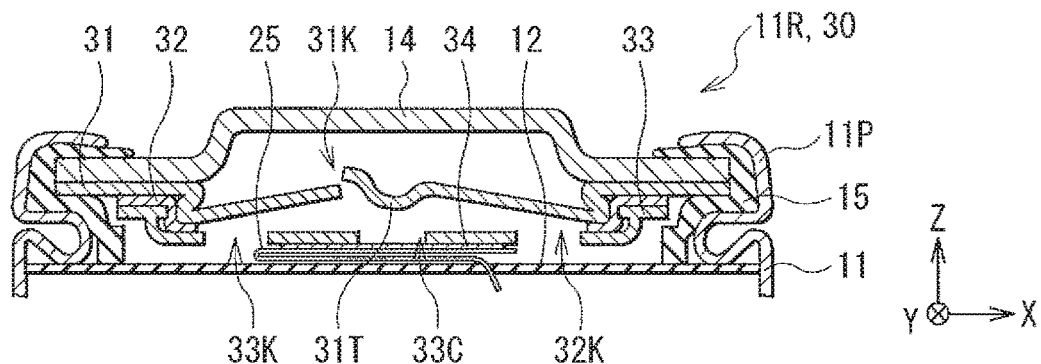
FIG. 5 is a cross-sectional view for explaining operation of the secondary battery.
Figure 6:
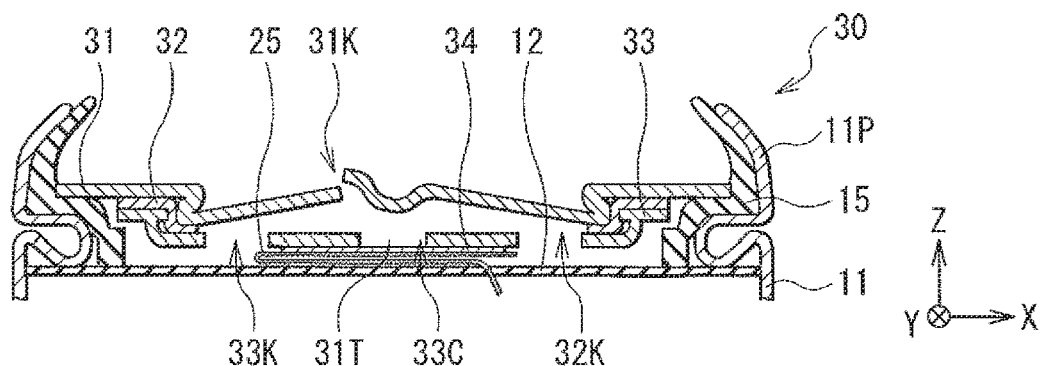
FIG. 6 is a cross-sectional view for explaining the operation of the secondary battery following FIG. 5.

Each of FIG. 5 and FIG. 6 illustrates a cross-sectional configuration corresponding to FIG. 2, in order to describe the operation of the secondary battery (operation during an increase in internal pressure described later). Hereinafter, FIG. 2 will be referred to together with FIG. 5 and FIG. 6 as needed.

When the secondary battery is charged, for example, lithium ions are extracted from the positive electrode 21, and the lithium ions are inserted in the negative electrode 22 through the electrolytic solution. On the other hand, when the secondary battery is discharged, for example, lithium ions are extracted from the negative electrode 22, and the lithium ions are inserted in the positive electrode 21 through the electrolytic solution.

In this case, when the internal pressure of the battery can 11 increases, the safety valve mechanism 30 operates in order to prevent, for example, rupture and breakage of the secondary battery.

Specifically, during normal operation of the secondary battery, as illustrated in FIG. 2, the safety cover 31 has not been opened yet. Thus, even if the stripper disc 33 is provided with the cavity 33K, the safety cover 31 closes a gas release path utilizing the cavity 33K.

On the other hand, when gas is generated due to a side reaction such as a decomposition reaction of the electrolytic solution inside the battery can 11 during charging and discharging of the secondary battery, the gas is accumulated in the battery can 11, and therefore, the internal pressure of the battery can 11 increases. In this case, when the internal pressure of the battery can 11 has reached a certain level or more, as illustrated in FIG. 5, since the safety cover 31 partially opens, the protrusion 31T provided on the safety cover 31 is spaced apart from the sub disc 34. Consequently, since a cavity 31K is formed in the safety cover 31, the gas release path utilizing the cavity 33K is opened. Thus, the gas generated inside the battery can 11 is released via the cavity 33K.

Depending on the magnitude of the internal pressure, the bent portion 11P is deformed, so that the crimped structure 11R is broken. Consequently, as illustrated in FIG. 6, the battery lid 14 is detached from the battery can 11, so that the gas is released to the outside of the secondary battery.

Subsequently, a method of manufacturing a secondary battery will be described. The secondary battery is manufactured, for example, by the following procedure.

Figure 7:
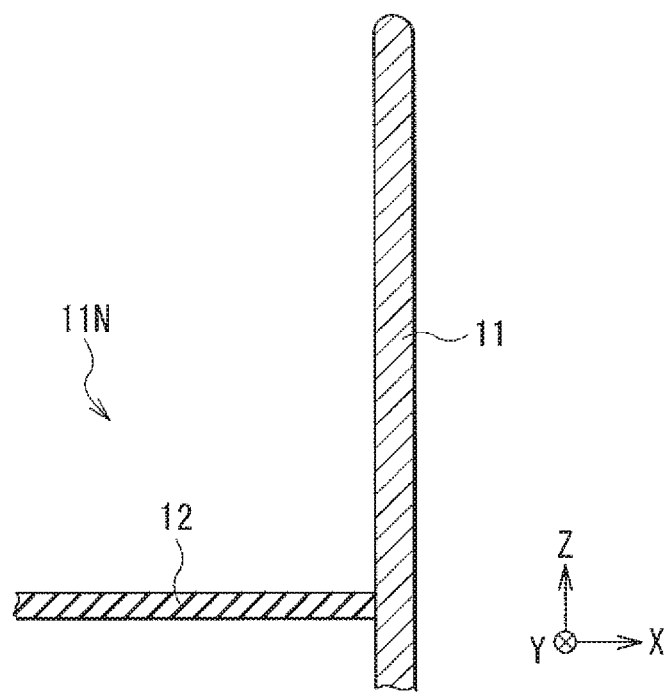
FIG. 7 is a cross-sectional view for explaining a process of manufacturing the secondary battery according to an embodiment of the present technology.
Figure 8:
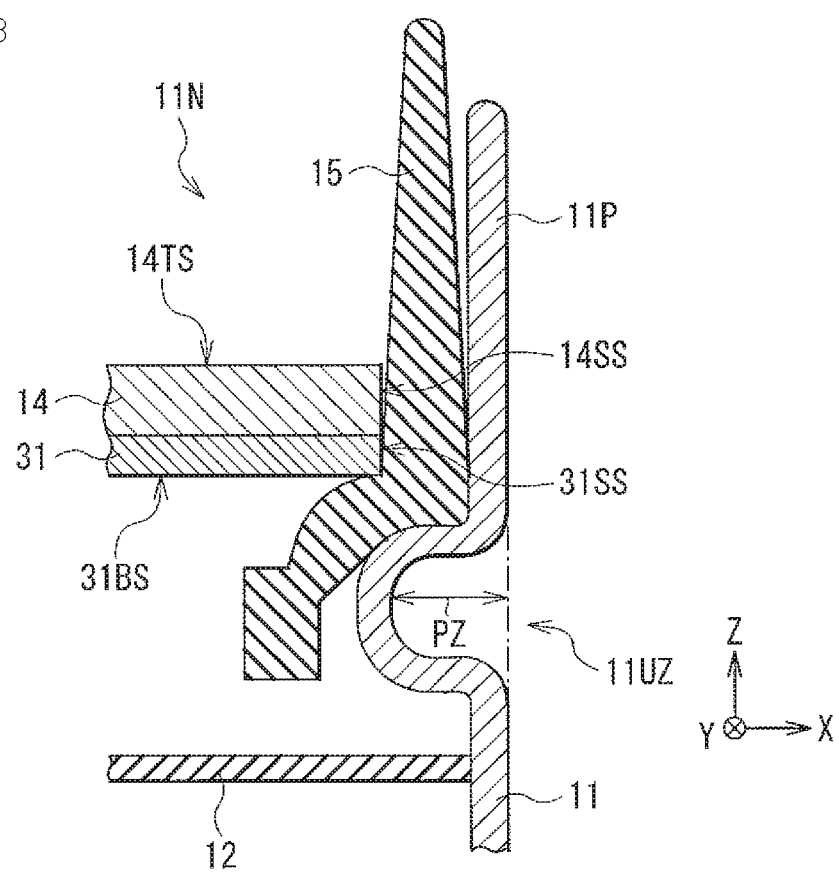
FIG. 8 is a cross-sectional view for explaining the process of manufacturing the secondary battery following FIG. 7.

Each of FIG. 7 and FIG. 8 illustrates a cross-sectional configuration corresponding to FIG. 3, in order to describe a process of manufacturing the secondary battery.

When fabricating the positive electrode 21, first, the positive electrode active material is, as necessary, mixed with the positive electrode binder, the positive electrode conductive agent, and the like to obtain a positive electrode mixture. Subsequently, the positive electrode mixture is dispersed in, for example, an organic solvent to obtain paste positive electrode mixture slurry. Subsequently, both surfaces of the positive electrode current collector 21A are coated with the positive electrode mixture slurry, and thereafter, the coated positive electrode mixture slurry is dried to form the positive electrode active material layer 21B. Subsequently, while heating the positive electrode active material layer 21B as necessary, the positive electrode active material layer 21B is compression-molded with use of a roll pressing machine or the like. In this case, compression molding may be repeated multiple times.

When fabricating the negative electrode 22, the negative electrode active material layers 22B are formed on both surfaces of the negative electrode current collector 22A by the procedure that is the same as in the positive electrode 21. Specifically, the negative electrode active material, and, for example, an anode-cathode binder and the negative electrode conductive agent are mixed to obtain a negative electrode mixture. Subsequently, the negative electrode mixture is dispersed in, for example, an organic solvent to obtain paste negative electrode mixture slurry. Subsequently, both surfaces of the negative electrode current collector 22A may be coated with the negative electrode mixture slurry, and thereafter, the coated negative electrode mixture slurry is dried to form the negative electrode active material layer 22B. Finally, the negative electrode active material layer 22B is compression-molded with use of a roll pressing machine or the like.

In the case where the secondary battery is assembled, the positive electrode lead 25 is coupled to the positive electrode current collector 21A by, for example, a welding method, and the negative electrode lead 26 is coupled to the negative electrode current collector 22A by, for example, a welding method. Subsequently, the positive electrode 21 and the negative electrode 22 are stacked with the separator 23 interposed therebetween, and then, the positive electrode 21, the negative electrode 22, and the separator 23 are wound to form the wound electrode body 20. Subsequently, the center pin 24 is inserted in the center space 20C of the wound electrode body 20.

Subsequently, as illustrated in FIG. 7, after preparing the battery can 11 in which the recess 11U is not provided, the wound electrode body 20 is housed inside the battery can 11 while sandwiching the wound electrode body 20 between the pair of insulating plates 12 and 13. In this case, one end of the positive electrode lead 25 is coupled to the safety valve mechanism 30 by, for example, a welding method, and one end of the negative electrode lead 26 is coupled to the battery can 11 by, for example, a welding method.

Subsequently, the battery can 11 is processed using a beading machine (grooving machine) to form a recess 11UZ in the battery can 11 as illustrated in FIG. 8. Since the recess 11UZ formed here is a provisional recess, a depth PZ of the recess 11UZ is smaller than the depth P of the recess 11U (see FIG. 3) to be finally formed. Subsequently, the electrolytic solution may be injected inside the battery can 11, and the wound electrode body 20 may be impregnated with the injected electrolytic solution. Subsequently, the battery lid 14 and the safety valve mechanism 30 (safety cover 31) are housed inside the battery can 11 together with the gasket 15.

Finally, as illustrated in FIG. 1, at the open end 11N of the battery can 11, the battery lid 14 and the safety valve mechanism 30 are crimped with the gasket 15, whereby the crimped structure 11R is formed. After that, the battery can 11 is crushed in the longitudinal (height) direction using a pressing machine. Consequently, a portion of the battery can 11 near the recess 11UZ is deformed inward, so that the recess 11U is formed as illustrated in FIG. 3. Thus, in the state in which the wound electrode body 20 and the like are stored inside the battery can 11, the battery can 11 is closed by the battery lid 14, and at the same time, the battery lid 14 and the like are fixed to the battery can 11, therefore, the secondary battery is completed.

According to this secondary battery, since the bending ratio R1 is 10% to 13%, the effective operation of the safety valve mechanism 30 is secured as described above. Thus, excellent safety can be obtained.

In particular, when the overlap ratio R2 is 6% to 9%, the effective operation of the safety valve mechanism 30 is secured while suppressing detachment of the battery lid 14 and leakage of the electrolytic solution, so that a higher effect can be obtained.

Further, if the gasket 15 gradually decreases in the direction from the side surface 14SS to the top surface 14TS, the gap between the bent portion 11P and the battery lid 14 is easily sealed by the gasket 15 using the pressing force F, so that a higher effect can be obtained.

Further, when the thickness difference DT is 0.1 mm to 0.3 mm, the external tab is easily coupled to the battery lid 14 while securing the safety of the secondary battery, so that a higher effect can be obtained.

Further, when the thickness T3 is 0.27 mm to 0.31 mm, the external tab is easily coupled to the battery lid 14 while securing the battery capacity, so that a higher effect can be obtained.

Further, when the total thickness TT is 0.8 mm to 1 mm, the external tab is easily coupled to the battery lid 14 while securing the battery capacity, so that a higher effect can be obtained.

Furthermore, when the outer diameter D1 is 20 mm to 23 mm and the outer diameter D2 is 17.5 mm to 19.5 mm, even when the diameter of the cylindrical secondary battery is increased, the effective operation of the safety valve mechanism 30 is secured while suppressing detachment of the battery lid 14 and leakage of the electrolytic solution. Thus, the safety can be effectively improved.

If the gasket 15 contains polybutylene terephthalate or the like, the gap between the bent portion 11P and the battery lid 14 is sufficiently sealed while the battery can 11 and the battery lid 14 are electrically separated from each other, so that a higher effect can be obtained.

Next, description is given on applications (application examples) of the foregoing secondary battery.

Applications of a secondary battery are not particularly limited as long as the secondary battery is applied to a machine, a device, an appliance, an apparatus, a system (collective entity of a plurality of devices and the like), or the like that is capable of using the secondary battery as a driving electric power source, an electric power storage source for electric power accumulation, or the like. The secondary battery used as an electric power source may be a main electric power source, or may be an auxiliary electric power source. The main electric power source is an electric power source used preferentially regardless of the presence or absence of other power sources. The auxiliary electric power source may be, for example, an electric power source used instead of the main electric power source or an electric power source used by being switched from the main electric power source as necessary. When the secondary battery is used as the auxiliary electric power source, the kind of the main electric power source is not limited to the secondary battery.

Examples of applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include a mobile daily electric appliance such as an electric shaver; a storage device such as a backup electric power source and a memory card; an electric power tool such as an electric drill and an electric saw; a battery pack used as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications described above.

In particular, the secondary battery is effectively applicable to the battery pack, the electric vehicle, the electric power storage system, the electric power tool, the electronic apparatus, or the like. The reason for this is that since superior battery characteristics are demanded in these applications, performance can be effectively improved with use of the secondary battery of the present technology. The battery pack is an electric power source including the secondary battery. As will be described later, the battery pack may include a single battery or an assembled battery. The electric vehicle is a vehicle that works (runs) with use of the secondary battery as a driving electric power source, and as described above, the electric vehicle may be an automobile (such as a hybrid automobile) including a drive source other than the secondary battery. The electric power storage system is a system including the secondary battery as an electric power storage source. For example, in a home electric power storage system, electric power is accumulated in the secondary battery as an electric power storage source, and therefore, home electric products and the like can be used using the electric power. The electric power tool is a tool in which a movable section (such as a drill) is allowed to move with use of the secondary battery as a driving electric power source. The electronic apparatus is an apparatus executing various functions with use of the secondary battery as a driving electric power source (electric power supply source).

Herein, specific description is given on some application examples of the secondary battery. The configurations of the application examples explained below are merely examples, and may be changed as appropriate.

Figure 9:
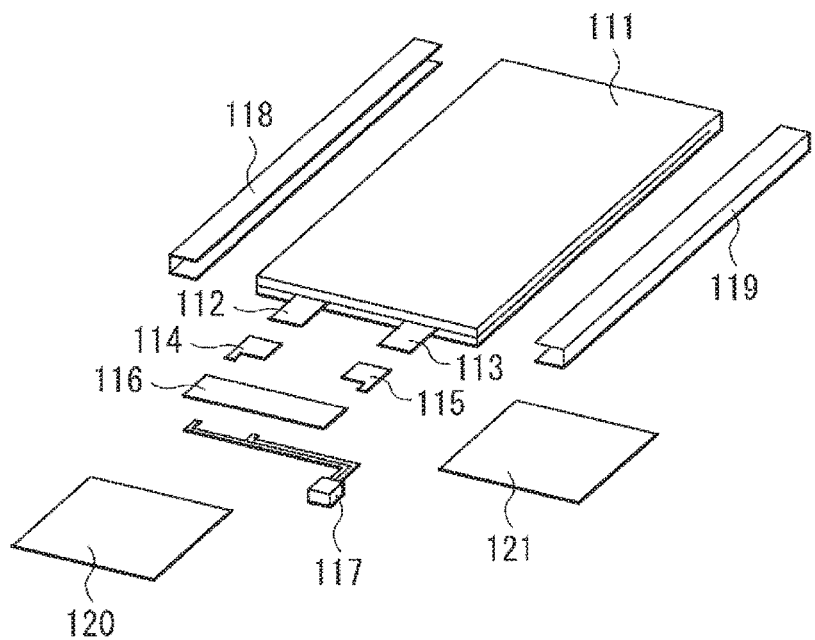
FIG. 9 is a perspective view illustrating a configuration of an application example (a battery pack: single battery) of the secondary battery according to an embodiment of the present technology.
Figure 10:
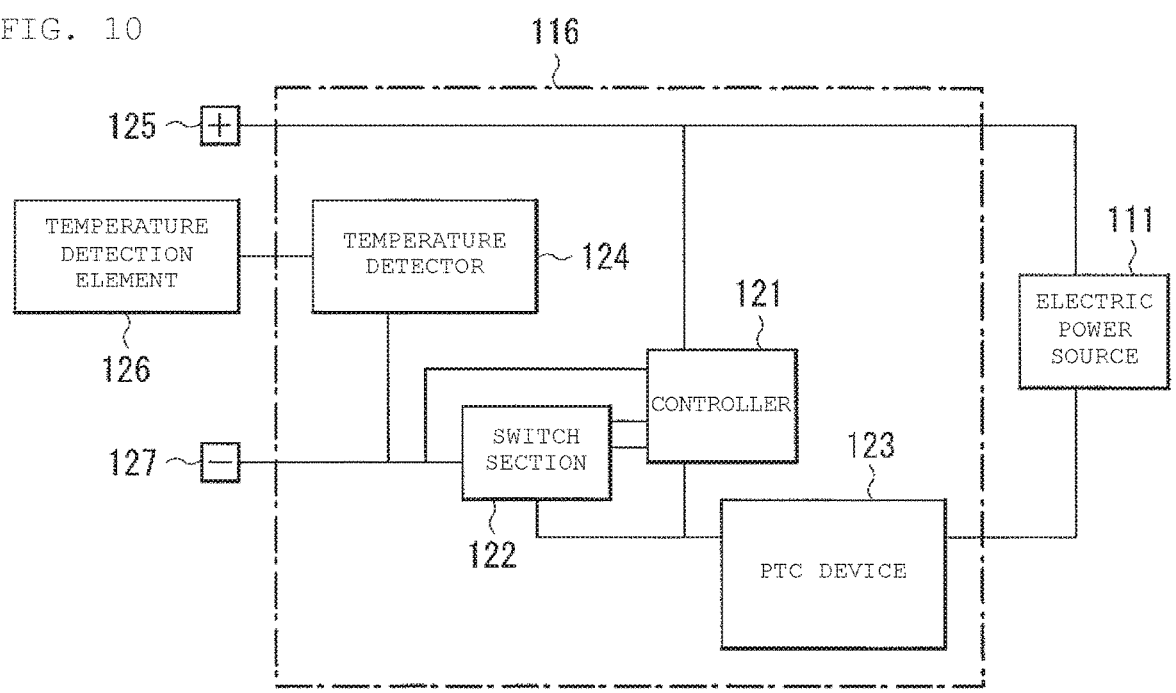
FIG. 10 is a block diagram illustrating a configuration of the battery pack illustrated in FIG. 9.

FIG. 9 illustrates a perspective configuration of a battery pack including a single battery. FIG. 10 illustrates a block configuration of the battery pack illustrated in FIG. 9. FIG. 9 illustrates a state that the battery pack is disassembled.

The battery pack described herein is a simple battery pack including single secondary battery (a so-called soft pack), and is mounted in, for example, an electronic apparatus typified by a smartphone. For example, the battery pack includes an electric power source 111 including a secondary battery, and a circuit board 116 coupled to the electric power source 111, as illustrated in FIG. 9. A positive electrode lead 112 and a negative electrode lead 113 are attached to the electric power source 111.

A pair of adhesive tapes 118 and 119 is attached to both side surfaces of the electric power source 111. A protection circuit module (PCM) is formed on the circuit board 116. The circuit board 116 is coupled to the positive electrode lead 112 through a tab 114, and is coupled to a negative electrode lead 113 through a tab 115. Moreover, the circuit board 116 is coupled to a lead wire 117 provided with a connector for external connection. While the circuit board 116 is coupled to the electric power source 111, the circuit board 116 is protected by a label 120 and an insulating sheet 121. The label 120 is attached to fix, for example, the circuit board 116 and the insulating sheet 121.

Moreover, for example, the battery pack includes the electric power source 111 and the circuit board 116 as illustrated in FIG. 10. The circuit board 116 includes, for example, a controller 121, a switch section 122, a PTC device 123, and a temperature detector 124. The electric power source 111 is allowed to be coupled to outside through a positive electrode terminal 125 and a negative electrode terminal 127, so that the electric power source 111 is charged and discharged through the positive electrode terminal 125 and the negative electrode terminal 127. The temperature detector 124 detects a temperature with use of a temperature detection terminal (a so-called T terminal) 126.

The controller 121 controls an operation of the entire battery pack (including a used state of the electric power source 111). The controller 121 includes, for example, a central processing unit (CPU) and a memory.

For example, in the case where a battery voltage reaches an overcharge detection voltage, the controller 121 causes the switch section 122 to be disconnected so that a charge current does not flow into a current path of the electric power source 111. Moreover, for example, in the case where a large current flows during charging, the controller 121 causes the switch section 122 to be disconnected, thereby blocking the charge current.

On the other hand, for example, in the case where a battery voltage reaches an overdischarge detection voltage, the controller 121 causes the switch section 122 to be disconnected so that a discharge current does not flow into a current path of the electric power source 111. Moreover, for example, in the case where a large current flows during discharging, the controller 121 causes the switch section 122 to be disconnected, thereby blocking the discharge current.

The overcharge detection voltage is, for example, 4.2 V±0.05 V, and the overdischarge detection voltage is, for example, 2.4 V±0.1 V.

The switch section 122 switches the used state of the electric power source 111, that is, whether or not the electric power source 111 is allowed to be coupled to an external device in accordance with an instruction from the controller 121. The switch section 122 includes, for example, a charge control switch and a discharge control switch. The charge control switch and the discharge control switch are each, for example, a semiconductor switch such as a field-effect transistor (MOSFET) using a metal oxide semiconductor. Charge and discharge currents are, for example, detected based on on-resistance of the switch section 122.

The temperature detector 124 measures a temperature of the electric power source 111, and outputs a measurement result of the temperature to the controller 121. The temperature detector 124 includes, for example, a temperature detection element such as a thermistor. The measurement result of the temperature measured by the temperature detector 124 is used, for example, in the case where the controller 121 performs charge and discharge control at the time of abnormal heat generation and in the case where the controller 121 performs a correction process at the time of calculating remaining capacity.

The circuit board 116 may not include the PTC device 123. In this case, a PTC device may be separately attached to the circuit board 116.

<2-2. Battery Pack (Assembled Battery)>

Figure 11:
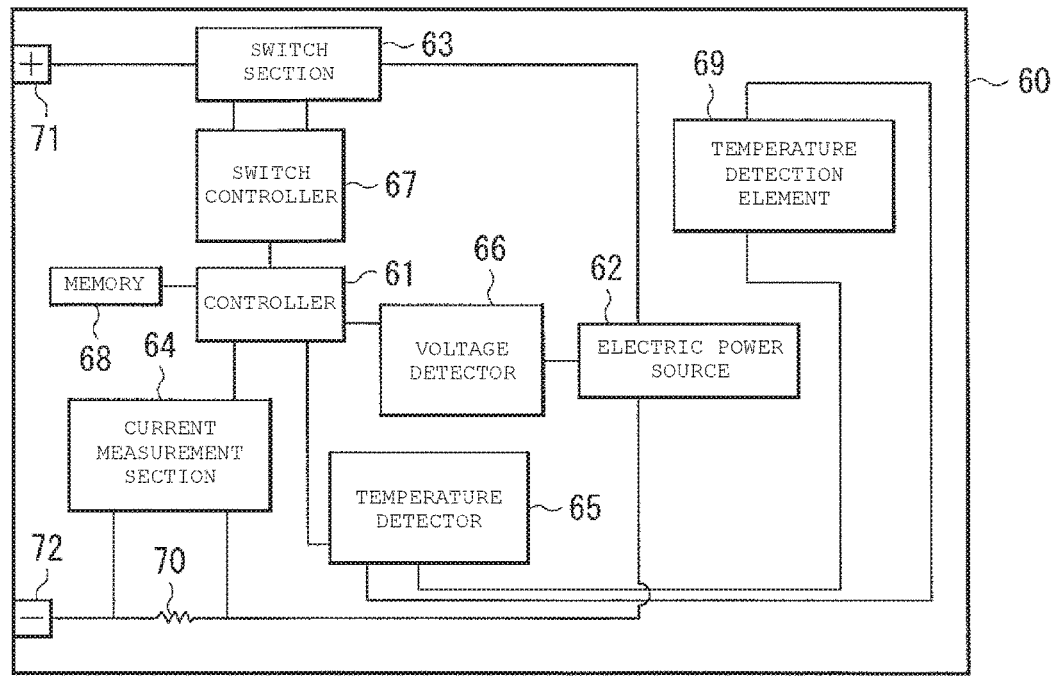
FIG. 11 is a block diagram illustrating a configuration of an application example (a battery pack: assembled battery) of the secondary battery according to an embodiment of the present technology.

FIG. 11 illustrates a block configuration of a battery pack including an assembled battery.

For example, the battery pack includes a controller 61, an electric power source 62, a switch section 63, a current measurement section 64, a temperature detector 65, a voltage detector 66, a switch controller 67, a memory 68, a temperature detection element 69, a current detection resistance 70, a positive electrode terminal 71, and a negative electrode terminal 72 in a housing 60. The housing 60 contains, for example, a plastic material.

The controller 61 controls an operation of the entire battery pack (including a used state of the electric power source 62). The controller 61 includes, for example, a CPU. The electric power source 62 is an assembled battery including two or more secondary batteries, and the two or more secondary batteries may be connected in series, in parallel, or in series-parallel combination. As an example, the electric power source 62 includes six secondary batteries in which two sets of series-connected three batteries are connected in parallel to each other.

The switch section 63 switches the used state of the electric power source 62, that is, whether or not the electric power source 62 is allowed to be coupled to an external device, in accordance with an instruction of the controller 61. The switch section 63 includes, for example, a charge control switch, a discharge control switch, a charging diode, and a discharging diode. The charge control switch and the discharge control switch are each, for example, a semiconductor switch such as a field-effect transistor (MOSFET) using a metal oxide semiconductor.

The current measurement section 64 measures a current with use of the current detection resistance 70, and outputs a measurement result of the current to the controller 61. The temperature detector 65 measures temperature with use of the temperature detection element 69, and outputs a measurement result of the temperature to the controller 61. The measurement result of the temperature is used, for example, in the case where the controller 61 performs charge and discharge control at the time of abnormal heat generation and in the case where the controller 61 performs a correction process at the time of calculating remaining capacity. The voltage detector 66 measures a voltage of the secondary battery in the electric power source 62, performs analog-to-digital conversion on the measured voltages, and supplies the resultant to the controller 61.

The switch controller 67 controls an operation of the switch section 63 in accordance with signals input respectively from the current measurement section 64 and the voltage detector 66.

For example, in the case where a battery voltage reaches an overcharge detection voltage, the switch controller 67 causes the switch section 63 (charge control switch) to be disconnected so that a charge current does not flow into a current path of the electric power source 62. This makes it possible to perform only discharge through the discharging diode in the electric power source 62. For example, when a large current flows during charging, the switch controller 67 blocks the charge current.

For example, in the case where a battery voltage reaches an overdischarge detection voltage, the switch controller 67 causes the switch section 63 (discharge control switch) to be disconnected so that a discharge current does not flow into a current path of the electric power source 62. This makes it possible to perform only charge through the charging diode in the electric power source 62. For example, when a large current flows during discharging, the switch controller 67 blocks the discharge current.

The overcharge detection voltage is, for example, 4.2 V±0.05 V, and the overdischarge detection voltage is, for example, 2.4 V±0.1 V.

The memory 68 includes, for example, an EEPROM as a non-volatile memory. The memory 68 stores, for example, numerical values calculated by the controller 61 and information of the secondary battery measured in a manufacturing process (such as an internal resistance in an initial state). In the case where the memory 68 stores full charge capacity of the secondary battery, the controller 61 is allowed to comprehend information such as remaining capacity.

The temperature detection element 69 measures a temperature of the electric power source 62, and outputs a measurement result of the temperature to the controller 61. The temperature detection element 69 includes, for example, a thermistor.

The positive electrode terminal 71 and the negative electrode terminal 72 are terminals coupled to an external device (such as a notebook personal computer) driven using the battery pack or an external device (such as a battery charger) used for charging the battery pack. The electric power source 62 is charged and discharged through the positive electrode terminal 71 and the negative electrode terminal 72.

Figure 12:
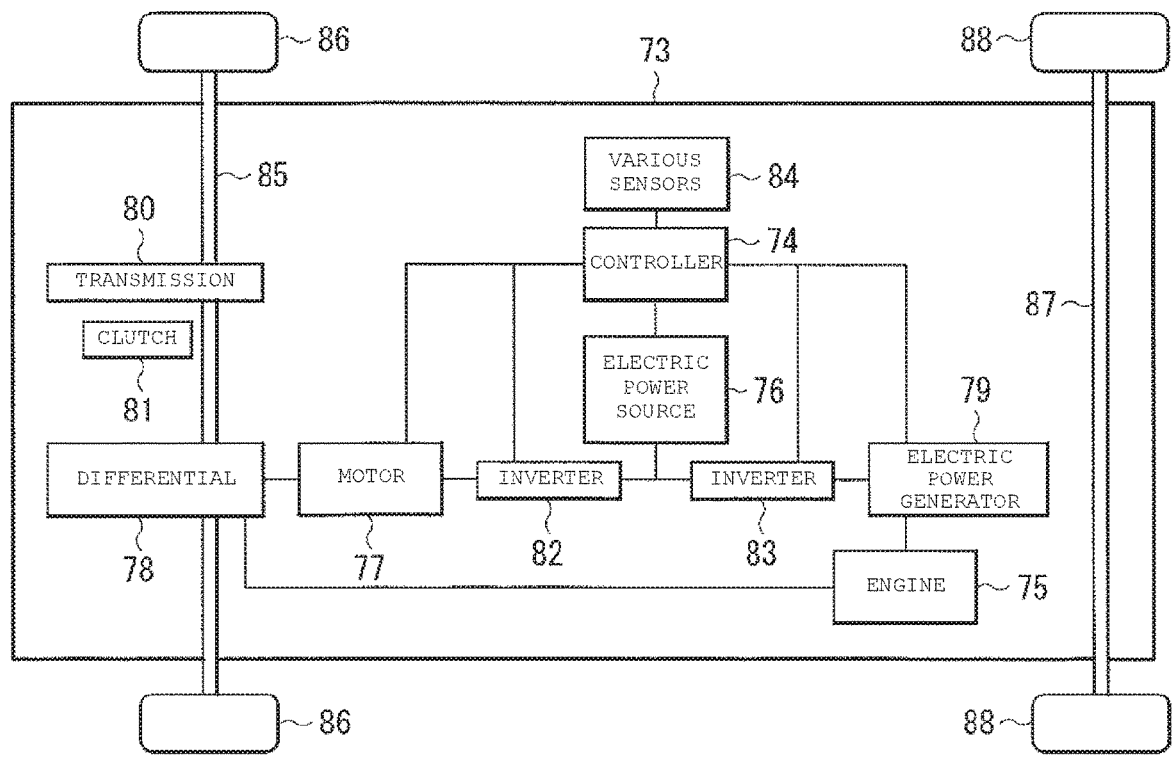
FIG. 12 is a block diagram illustrating a configuration of an application example (an electric vehicle) of the secondary battery according to an embodiment of the present technology.

FIG. 12 illustrates a block configuration of a hybrid automobile as an example of an electric vehicle.

For example, the electric vehicle includes a controller 74, an engine 75, an electric power source 76, a driving motor 77, a differential 78, an electric power generator 79, a transmission 80, a clutch 81, inverters 82 and 83, and various sensors 84 inside a housing 73 made of metal. Other than the components mentioned above, the electric vehicle includes, for example, a front-wheel drive shaft 85 and a front wheel 86 that are coupled to the differential 78 and the transmission 80, and a rear-wheel drive shaft 87, and a rear wheel 88.

The electric vehicle can be run with use of one of the engine 75 and the motor 77 as a drive source, for example. The engine 75 is a main power source, and is, for example, a gasoline engine. In the case where the engine 75 is used as a power source, drive power (torque) of the engine 75 is transferred to the front wheel 86 or the rear wheel 88 through the differential 78, the transmission 80, and the clutch 81 as drive sections, for example. Since the torque of the engine 75 is transferred to the electric power generator 79, the electric power generator 79 generates alternating-current electric power with use of the torque, and since the alternating-current electric power is converted into direct-current electric power through the inverter 83, the direct-current electric power is accumulated in the electric power source 76. In contrast, in the case where the motor 77 as a conversion section (converter) is used as a power source, electric power (direct-current electric power) supplied from the electric power source 76 is converted into alternating-current electric power through the inverter 82, and therefore, the motor 77 is driven with use of the alternating-current electric power. Drive power (torque) obtained by converting the electric power by the motor 77 is transferred to the front wheel 86 and the rear wheel 88 through the differential 78, the transmission 80, and the clutch 81 as the drive sections (driver), for example.

When speed of the electric vehicle is reduced by a brake mechanism, resistance at the time of deceleration is transferred to the motor 77 as torque, and thus the motor 77 may generate alternating-current electric power by utilizing the torque. It is preferable that the alternating-current electric power be converted into direct-current electric power through the inverter 82, and thus the direct-current regenerative electric power be accumulated in the electric power source 76.

The controller 74 controls an operation of the entire electric vehicle. The controller 74 includes, for example, a CPU. The electric power source 76 includes one or more secondary batteries. The electric power source 76 is coupled to an external power source, and the electric power source 76 is allowed to accumulate electric power by receiving electric power supply from the external electric power source. The various sensors 84 are used, for example, for controlling the number of revolutions of the engine 75 and for controlling opening level (throttle opening level) of a throttle valve. The various sensors 84 include, for example, one or more of a speed sensor, an acceleration sensor, and an engine speed sensor.

The description has been given above on a case where the electric vehicle is the hybrid automobile; however, the electric vehicle may be a vehicle (an electric automobile) that works with use of only the electric power source 76 and the motor 77 without using the engine 75.

Figure 13:
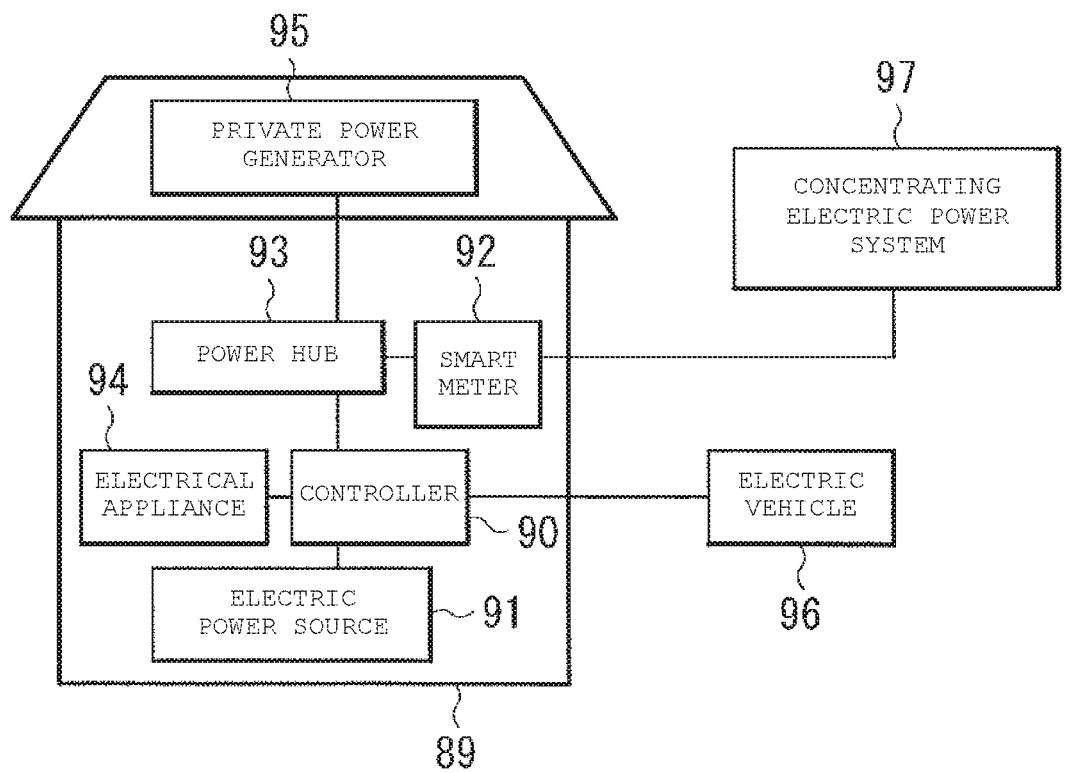
FIG. 13 is a block diagram illustrating a configuration of an application example (an electric power storage system) of the secondary battery according to an embodiment of the present technology.

FIG. 13 illustrates a block configuration of an electric power storage system.

For example, the electric power storage system includes a controller 90, an electric power source 91, a smart meter 92, and a power hub 93 inside a house 89 such as a general residence or a commercial building.

In this case, the electric power source 91 may be coupled to, for example, an electrical appliance 94 provided inside the house 89, and may be allowed to be coupled to an electric vehicle 96 parked outside the house 89. Further, for example, the electric power source 91 may be coupled to a private power generator 95 provided in the house 89 through the power hub 93, and may be allowed to be coupled to an outside concentrating electric power system 97 through the smart meter 92 and the power hub 93.

The electrical appliance 94 includes, for example, one or more home electric products such as a refrigerator, an air conditioner, a television, and a water heater. The private power generator 95 includes, for example, one or more of a solar power generator, a wind-power generator, and the like. The electric vehicle 96 includes, for example, one or more of an electric automobile, an electric motorcycle, a hybrid automobile, and the like. The concentrating electric power system 97 includes, for example, one or more of a thermal power plant, an atomic power plant, a hydraulic power plant, a wind-power plant, and the like.

The controller 90 controls an operation of the entire electric power storage system (including a used state of the electric power source 91). The controller 90 includes, for example, a CPU. The electric power source 91 includes one or more secondary batteries. The smart meter 92 is, for example, an electric power meter that is compatible with a network and is provided in the house 89 demanding electric power, and may be communicable with an electric power supplier. Accordingly, for example, while the smart meter 92 communicates with outside, the smart meter 92 controls the balance between supply and demand in the house 89, which allows effective and stable energy supply.

In the electric power storage system, for example, electric power may be accumulated in the electric power source 91 from the concentrating electric power system 97 as an external electric power source through the smart meter 92 and the power hub 93, and electric power is accumulated in the electric power source 91 from the private power generator 95 as an independent electric power source through the power hub 93. The electric power accumulated in the electric power source 91 is supplied to the electrical appliance 94 and the electric vehicle 96 in accordance with an instruction from the controller 90, so that the electrical appliance 94 becomes operable, and the electric vehicle 96 becomes chargeable. In other words, the electric power storage system is a system that makes it possible to accumulate and supply electric power in the house 89 with use of the electric power source 91.

The electric power accumulated in the electric power source 91 is usable as required. Thus, for example, electric power is accumulated in the electric power source 91 from the concentrating electric power system 97 in the middle of night when an electric rate is inexpensive, and the electric power accumulated in the electric power source 91 may be used during daytime hours when the electric rate is expensive.

The foregoing electric power storage system may be provided for each household (family unit), or may be provided for a plurality of households (a plurality of family units).

Figure 14:
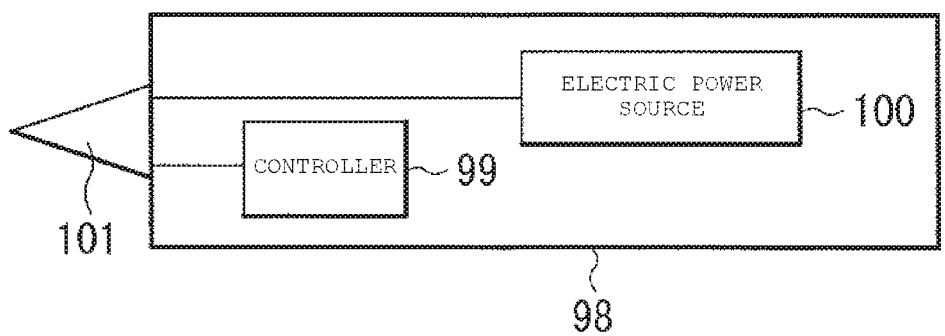
FIG. 14 is a block diagram illustrating a configuration of an application example (an electric power tool) of the secondary battery according to an embodiment of the present technology.

FIG. 14 illustrates a block configuration of an electric power tool.

The electric power tool described herein is, for example, an electric drill. The electric power tool includes, for example, a controller 99 and an electric power source 100 inside a tool body 98. For example, a drill section 101 as a movable section is attached to the tool body 98 in an operable (rotatable) manner.

The tool body 98 contains, for example, a plastic material. The controller 99 controls an operation of the entire electric power tool (including a used state of the electric power source 100). The controller 99 includes, for example, a CPU. The electric power source 100 includes one or more secondary batteries. The controller 99 allows electric power to be supplied from the electric power source 100 to the drill section 101 in accordance with an operation by an operation switch.

EXAMPLES

Description is given on examples of the present technology.

Experimental Examples 1-1 to 1-11

A cylindrical lithium ion secondary battery illustrated in FIGS. 1 to 4 was fabricated by the following procedure.

In the case of fabricating the positive electrode 21, first, 94 parts by mass of a positive electrode active material ($LiCoO_2$), 3 parts by mass of a positive electrode binder (polyvinylidene fluoride), and 3 parts by mass of a positive electrode conductive agent (graphite) were mixed to obtain a positive electrode mixture. Subsequently, the positive electrode mixture was charged in an organic solvent (N-methyl-2-pyrrolidone), and the organic solvent was then stirred to obtain a paste-like positive electrode mixture slurry. Subsequently, both surfaces of the positive electrode current collector 21A (a strip-shaped aluminum foil, thickness=15 μm) were coated with the positive electrode mixture slurry with use of a coating apparatus, and thereafter, the positive electrode mixture slurry was dried to form the positive electrode active material layer 21B. Finally, the positive electrode active material layer 21B was compression-molded with use of a roll pressing machine.

In the case of fabricating the negative electrode 22, 95 parts by mass of a negative electrode active material (graphite), 3 parts by mass of a negative electrode binder (polyvinylidene fluoride), and 2 parts by mass of a negative electrode conductive agent (carbon black) were first mixed to obtain a negative electrode mixture. Subsequently, the negative electrode mixture was charged in an organic solvent (N-methyl-2-pyrrolidone), and the organic solvent was then stirred to obtain a paste-like negative electrode mixture slurry. Subsequently, both surfaces of the negative electrode current collector 22A (a strip-shaped copper foil, thickness=15 μm) were coated with the negative electrode mixture slurry with use of a coating apparatus, and thereafter, the negative electrode mixture slurry was dried to form the negative electrode active material layer 22B. Finally, the negative electrode active material layer 22B was compression-molded with use of a roll pressing machine.

In the case of preparing the electrolytic solution, after an electrolyte salt (LiPF$_6$) was added to a solvent (ethylene carbonate, ethyl methyl carbonate, and dimethyl carbonate), the solvent then stirred. In this case, a mixing ratio (weight ratio) of the solvent was ethylene carbonate:ethyl methyl carbonate:dimethyl carbonate=20:20:60, and the content of the electrolyte salt in the solvent was set to 1 mol/kg.

In the case where the secondary battery is assembled, first, the aluminum positive electrode lead 25 was welded to the positive electrode current collector 21A, and the nickel negative electrode lead 26 was welded to the negative electrode current collector 22A. Subsequently, the positive electrode 21 and the negative electrode 22 were stacked with the separator 23 (porous polyethylene film, thickness=16 μm) interposed therebetween. Subsequently, after the positive electrode 21 and the negative electrode 22 stacked with the separator 23 interposed therebetween were spirally wound, an adhesive tape was applied to a winding end portion, whereby the wound electrode body 20 was fabricated. Subsequently, the center pin 24 was inserted in the center space 20C of the wound electrode body 20.

Subsequently, the safety valve mechanism 30 including the aluminum safety cover 31 (thickness T5), the polypropylene disc holder 32, the aluminum stripper disc 33, and the aluminum sub disc 34 was prepared. In this case, the stripper disc 33 provided with the six cavities 33K was used.

Subsequently, the wound electrode body 20 was housed inside the nickel-plated iron battery can 11 (outer diameter D1, thickness T3 of the bent portion 11P) while being sandwiched between the pair of insulating plates 12 and 13. In this case, one end of the positive electrode lead 25 was welded to the safety valve mechanism 30 (sub disc 34), and, at the same time, one end of the negative electrode lead 26 was welded to the battery can 11. Subsequently, the battery can 11 was processed using a beading machine to form the recess 11UZ (depth PZ) in the battery can 11. Subsequently, the electrolytic solution was injected inside the battery can 11 by using a pressure reduction method, whereby the wound electrode body 20 was impregnated with the electrolytic solution.

Finally, the battery lid 14 (outer diameter D2, thickness T4) and the safety valve mechanism 30 were crimped at the open end 11N of the battery can 11 with the gasket 15 (thickness T1, thickness T2), whereby the crimped structure 11R was formed. After that, the battery can 11 was crushed using a pressing machine to form the recess 11U (depth P). Details regarding the outer diameter D1 are as shown in Table 1.

When the crimped structure 11R was formed, the bending length L1 and the bending ratio R1 were changed by adjusting a bending amount of the bent portion 11P. Details regarding the bending length L1 and the bending ratio R1 are as shown in Table 1. In this case, the outer diameter D2=19.32 mm, the overlap length L2=1.35 mm, the overlap ratio R2=7%, the depth P=1.6 mm, the thickness T1=0.65 mm, the thickness T2=0.45 mm, the thickness difference DT=0.2 mm, the thickness T3=0.3 mm, the thickness T4=0.6 mm, the thickness T5=0.3 mm, and the distance H=0.15 mm.

Consequently, while the battery can 11 was closed by the battery lid 14, the wound electrode body 20 and the like were housed inside the battery can 11, and therefore, a cylindrical lithium ion secondary battery (diameter=21.2 mm, height=70 mm) was completed.

In order to evaluate the safety of the secondary battery, when gas release characteristics and sealing durability characteristics were examined, the results shown in Table 1 were obtained.

When the gas release characteristics were examined, the release pressure (kgf/cm$^2$) of the secondary battery was determined by conducting a heating test for the secondary battery.

Specifically, the vicinity of the center of the secondary battery (battery can 11) was heated until the internal pressure of the battery can 11 was released due to the operation of the safety valve mechanism 30 (formation of the cavity 31K) to measure the internal pressure (release pressure) at the time of releasing of the internal pressure of the battery can 11. In this case, the crimped structure 11R was broken due to deformation of the bent portion 11P, so that the battery lid 14 was detached from the battery can 11, and therefore, the internal pressure of the battery can 11 was released.

Consequently, when the release pressure was 65 kgf/cm$^2$ or more, it was determined that the gas release characteristics were good. This is because the safety valve mechanism 30 does not operate by heating using a burner or the like, so that the efficiency percentage is 100% in the heating test using the burner (burner test) for the secondary battery.

On the other hand, when the release pressure was less than 65 kgf/cm$^2$, it was determined that the gas release characteristics were not good. This is because the safety valve mechanism 30 tends to operate even by heating using a burner or the like, so that the efficiency percentage decreases to 80% or less in the burner test.

When the sealing durability characteristics were examined, in the formation of the crimped structure 11R, the contact ratio (%) of the specific bent portion 11PP to the gasket 15 was determined.

Specifically, after the crimped structure 11R was formed by bending the bent portion 11P, a length of a portion where the specific bent portion 11PP was in contact with the gasket 15 was measured. Based on the measurement result, the contact ratio was calculated based on the formula: (the length (measured value) of the portion where the specific bent portion 11PP is in contact with the gasket 15/the maximum length (theoretical value) with which the specific bent portion 11PP can be in contact with the gasket 15)×100.

Consequently, when the contact ratio was 80% or more, it was determined that the sealing durability characteristics were good. This is because, even if the secondary battery is dropped, the battery lid 14 does not detach and the electrolytic solution does not leak, so that the success rate in a dropping test of the secondary battery is 100%. Details of the dropping test will be described later.

On the other hand, when the contact ratio was less than 80%, it was determined that the sealing durability characteristics were not good. This is because, if the secondary battery is dropped, the battery lid 14 tends to detach and the electrolytic solution tends to leak, so that the success rate in the dropping test of the secondary battery is less than 100%.

TABLE 1

| Experimental Examples | Outer diameter D1 (mm) | Bending length L1 (mm) | Bending ratio R1 (%) | Release pressure (kgf/cm$^2$) | Contact ratio (%) |
|---|---|---|---|---|---|
| 1-1 | 20.35 | 1.99 | 9.8 | 64 | 100 |
| 1-2 | 20.35 | 2.04 | 10 | 67 | 100 |
| 1-3 | 20.35 | 2.5 | 12.3 | 96 | 97 |
| 1-4 | 20.35 | 2.65 | 13 | 106 | 88 |
| 1-5 | 21.2 | 1.99 | 9.4 | 60 | 100 |
| 1-6 | 21.2 | 2.12 | 10 | 67 | 100 |
| 1-7 | 21.2 | 2.5 | 11.8 | 90 | 100 |
| 1-8 | 21.2 | 2.69 | 12.7 | 102 | 94 |
| 1-9 | 21.2 | 2.73 | 12.9 | 105 | 88 |
| 1-10 | 21.2 | 2.76 | 13 | 106 | 80 |
| 1-11 | 21.2 | 3.01 | 14.2 | 120 | 50 |

Each of the release pressure and the contact ratio largely fluctuated according to the bending ratio R1. Specifically, while the release pressure gradually increased as the bending ratio R1 increased, the contact ratio gradually decreased as the bending ratio R1 increased. In this case, when the bending ratio R1 was within a suitable range (=10% to 13%), a good release pressure was obtained, and, at the same time, a good contact ratio was also obtained.

The relationship between the bending ratio R1 and the release pressure and the contact ratio described above was similarly obtained when the outer diameter D1 was changed.

Experimental Examples 2-1 to 2-11

A cylindrical lithium ion secondary battery was fabricated by the same procedure except that the outer diameter D2, the overlap length L2 and the overlap ratio R2 were changed as shown in Table 2, and the battery characteristics (gas release characteristics and sealing durability characteristics) were examined. In this case, the outer diameter D1=21.2 mm, and the bending ratio R1=10.4%.

TABLE 2

| Experimental Examples | Outer diameter D2 (mm) | Overlap length L2 (mm) | Overlap ratio R2 (%) | Release pressure (kgf/cm$^2$) | Contact ratio (%) |
|---|---|---|---|---|---|
| 2-1 | 17.7 | 1.05 | 5 | 65 | 100 |
| 2-2 | 17.7 | 1.1 | 6 | 77 | 100 |
| 2-3 | 17.7 | 1.56 | 9 | 96 | 93 |
| 2-4 | 17.7 | 1.71 | 9.6 | 106 | 80 |
| 2-5 | 19.32 | 1.05 | 5.8 | 65 | 100 |
| 2-6 | 19.32 | 1.18 | 6 | 77 | 100 |
| 2-7 | 19.32 | 1.56 | 8.1 | 90 | 100 |
| 2-8 | 19.32 | 1.75 | 9 | 102 | 88 |
| 2-9 | 19.32 | 1.79 | 9.3 | 105 | 84 |
| 2-10 | 19.32 | 1.82 | 9.4 | 106 | 81 |
| 2-11 | 19.32 | 2.07 | 10.7 | 120 | 80 |

Each of the release pressure and the contact ratio largely fluctuated according to the overlap ratio R2. Specifically, while the release pressure gradually increased as the overlap ratio R2 increased, the contact ratio gradually decreased as the overlap ratio R2 increased. In this case, when the overlap ratio R2 was within a suitable range (=6% to 90%), a good release pressure was obtained, and, at the same time, a good contact ratio was also obtained.

The relationship between the overlap ratio R2 and the release pressure and the contact ratio described above was similarly obtained when the outer diameter D2 was changed.

Experimental Examples 3-1 to 3-10

A cylindrical lithium ion secondary battery was fabricated by the same procedure except that the thickness T1, the thickness T2 and the thickness difference DT were changed as shown in Table 3.

In order to evaluate the safety of the secondary battery, when drop durability characteristics and design characteristics were examined, the results shown in Table 3 were obtained.

When the drop durability characteristics were examined, the dropping test of the secondary battery was conducted to determine the success rate (%) in the dropping test.

Specifically, first, the secondary battery was charged until the voltage reached 4.4 V. Subsequently, operation of dropping the charged secondary battery to the ground was performed 30 times so that the crimped structure 11R (bent portion 11P) was a drop surface, whereby whether a problem occurred due to an impact when the secondary battery was dropped was confirmed visually. The "problem" includes detachment of the battery lid 14 and leakage of the electrolytic solution. Consequently, when the problem had never occurred, it was comprehensively determined that "no problem occurred", and when the problem had ever occurred, it was comprehensively determined that "the problem occurred". Subsequently, it was determined whether the problem occurred by repeating the above-described determination operation 100 times (the number of dropping tests=100 times). Finally, the success rate (dropping success rate) in the dropping test was calculated based on the formula: (the number of times with which no problems occurred/100 times)×100.

Consequently, when the dropping success rate was 80% or more, it was determined that drop durability was good. This is because by the impact applied when the secondary battery was dropped, or the like, the battery lid 14 is less likely to detach, and at the same time, the electrolytic solution is less likely to leak.

On the other hand, when the dropping success rate was less than 80%, it was determined that the drop durability was not good. This is because due to the impact applied when the secondary battery was dropped, the battery lid 14 tends to detach, and at the same time, the electrolytic solution tends to leak.

When the design characteristics were examined, after the crimped structure 11R was formed, the distance H (mm) was measured.

Consequently, when the distance H was 0.05 mm or more, it was determined that the design characteristics were good. This is because a space for welding the external tab to the battery lid 14 functioning as a portion of the positive electrode 21 is secured, so that the external tab is easily coupled to the battery lid 14.

On the other hand, when the distance H was less than 0.05 mm, it was determined that the design characteristics were not good. This is because the space for welding the external tab to the battery lid 14 is not secured, so that the external tab is less likely to be coupled to the battery lid 14.

TABLE 3

| Experimental Examples | Thickness T1 (mm) | Thickness T2 (mm) | Thickness difference DT (mm) | Dropping success rate (%) | Distance H (mm) |
|---|---|---|---|---|---|
| 3-1 | 0.5 | 0.1 | 0.4 | 50 | 0.35 |
| 3-2 | 0.5 | 0.2 | 0.3 | 80 | 0.25 |
| 3-3 | 0.5 | 0.3 | 0.2 | 90 | 0.15 |
| 3-4 | 0.5 | 0.4 | 0.1 | 95 | 0.05 |
| 3-5 | 0.5 | 0.5 | 0 | 100 | −0.05 |
| 3-6 | 0.7 | 0.25 | 0.45 | 20 | 0.4 |
| 3-7 | 0.7 | 0.35 | 0.35 | 65 | 0.3 |
| 3-8 | 0.7 | 0.45 | 0.25 | 85 | 0.2 |
| 3-9 | 0.7 | 0.55 | 0.15 | 92 | 0.1 |
| 3-10 | 0.7 | 0.65 | 0.05 | 97 | 0 |

Each of the dropping success rate and the distance H largely fluctuated according to the thickness difference DT. Specifically, while the dropping success rate gradually decreased as the thickness difference DT increased, the distance H gradually increased as the thickness difference DT increased. In this case, when the thickness difference DT was within a suitable range (=0.1 mm to 0.3 mm), a good dropping success rate was obtained, and, at the same time, a good distance H was obtained.

Experimental Examples 4-1 to 4-6

A cylindrical lithium ion secondary battery was fabricated by the same procedure except that the thickness T3 was changed as shown in Table 4.

In order to evaluate the safety of the secondary battery, when gas release characteristics and capacity characteristics were examined, the results shown in Table 4 were obtained. A procedure for examining the gas release characteristics is as described above.

When the capacity characteristics were examined, the battery capacity (Ah) was measured by charging and discharging the secondary battery. In this case, the secondary battery was charged under standard charge conditions and was then discharged under standard discharge conditions. Consequently, when the battery capacity was 3 Ah or more, it was possible to respond to market demands, so that it was determined that the capacity characteristics were good. On the other hand, when the battery capacity was less than 3 Ah, it was not possible to respond to market demands, so that it was determined that the capacity characteristics were not good. Here, the standard charge conditions are conditions in which in the ambient temperature environment (23° C.), charge is performed at a constant current of 1 C until a voltage reaches 4.2 V, and charge is further performed at a constant voltage of 4.2 V until the current reaches 0.025 C. The standard discharge conditions are conditions in which in the same environment, discharge is performed at a constant current of 0.2 C until a voltage reaches 2.5 V. The "1 C" refers to a current value at which the battery capacity (theoretical capacity) is completely discharged in 1 hour, the "0.025 C" refers to a current value at which the battery capacity is completely discharged in 40 hours, and the "0.2 C" refers to a current value at which the battery capacity is completely discharged in 5 hours.

TABLE 4

| Experimental Examples | Thickness T3 (mm) | Release pressure (kgf/cm$^2$) | Battery capacity (Ah) |
|---|---|---|---|
| 4-1 | 0.25 | 65 | 5.2 |
| 4-2 | 0.27 | 70 | 4.4 |
| 4-3 | 0.29 | 72 | 3.8 |
| 4-4 | 0.31 | 79 | 3.2 |
| 4-5 | 0.33 | 86 | 2.5 |
| 4-6 | 0.35 | 93 | 1.8 |

Each of the release pressure and the battery capacity largely fluctuated according to the thickness T3. Specifically, while the release pressure gradually increased as the thickness T3 increased, the battery capacity gradually decreased as the thickness T3 increased. In this case, when the thickness T3 was within a suitable range (=0.27 mm to 0.31 mm), while a high battery capacity was obtained, the release pressure further increased.

Experimental Examples 5-1 to 5-5

A cylindrical lithium ion secondary battery was fabricated by the same procedure except that the thickness T4, the thickness T5 and the total thickness TT were changed as shown in Table 5.

In order to evaluate the safety of the secondary battery, when gas release characteristics and capacity characteristics were examined, the results shown in Table 5 were obtained. A procedure for examining the gas release characteristics and the capacity characteristics is as described above.

TABLE 5

| Experimental Examples | Thickness T4 (mm) | Thickness T5 (mm) | Total thickness TT (mm) | Release pressure (kgf/cm$^2$) | Battery capacity (Ah) |
|---|---|---|---|---|---|
| 5-1 | 0.3 | 0.4 | 0.7 | 65 | 4.5 |
| 5-2 | 0.3 | 0.5 | 0.8 | 70 | 4.2 |
| 5-3 | 0.3 | 0.6 | 0.9 | 75 | 3.8 |
| 5-4 | 0.3 | 0.7 | 1 | 80 | 3.2 |
| 5-5 | 0.3 | 0.8 | 1.1 | 85 | 2.5 |

Each of the release pressure and the battery capacity largely fluctuated according to the total thickness TT. Specifically, while the release pressure gradually increased as the total thickness TT increased, the battery capacity gradually decreased as the total thickness TT increased. In this case, when the total thickness TT was within a suitable range (=0.8 mm to 1 mm), while a high battery capacity was obtained, the release pressure further increased.

From the results shown in Tables 1 to 5, when the bending ratio R1 satisfied suitable conditions (=10% to 13%), both the gas release characteristics and the sealing durability characteristics were improved. Thus, excellent safety was obtained.

The present technology is described thus far with reference to embodiments and examples thereof; however, the present technology is not limited to the examples described in the embodiments and examples above, but various modifications may be made.

Specifically, for example, although the case where the battery element has a wound structure has been described, the present invention is not limited thereto. The secondary battery of the present technology may be applied, for example, when the battery element has another structure such as a laminated structure.

Moreover, for example, description has been given of the secondary battery (lithium ion secondary battery) in which the capacitance of the negative electrode is obtained using a lithium insertion phenomenon and a lithium extraction phenomenon. However, this is not limitative. The secondary battery of the present technology may be a secondary battery (lithium metal secondary battery) in which the capacitance of the negative electrode is obtained using a lithium precipitation phenomenon and a lithium dissolution phenomenon. Alternatively, the secondary battery of the present technology may be a secondary battery in which the capacitance of the negative electrode is obtained as the sum of the capacitance using the lithium insertion phenomenon and the lithium extraction phenomenon and the capacitance using the lithium precipitation phenomenon and the lithium dissolution phenomenon by causing the capacitance of the negative electrode material capable of inserting and extracting lithium to be smaller than the capacitance of the positive electrode.

Moreover, the description has been given of the case where lithium is used as the electrode reactant. However, the electrode reactant is not limited thereto. The electrode reactant may be, for example, other Group 1 element such as sodium and potassium in the long-periodic table, a Group 2 element such as magnesium and calcium in the long-periodic table, or other light metal such as aluminum. Alternatively, the electrode reactant may be an alloy including one or more of the foregoing series of elements.

The effects described in the present description are illustrative and non-limiting, and the technology may have effects other than those described in the present description.

The present technology is described below in further detail according to an embodiment of the present disclosure.

(1)

A secondary battery, including:

a housing member having a bent portion defining an open end;

a battery element including a positive electrode, a negative electrode, and an electrolytic solution and housed in the housing member;

a lid member which extends in a cross direction crossing a housing direction of the battery element to the housing member to close the open end of the housing member and has a bottom surface facing the battery element, a top surface opposite to the bottom surface, and a side surface coupled to the bottom surface and the top surface; and a sealing member interposed between the bent portion and the lid member, wherein the bent portion is bent along each of the bottom surface, the side surface and the top surface of the lid member and includes a specific bent portion bent along each of the side surface and the top surface of the lid member, and a bending ratio R1 (=(L1/D1)×100) calculated based on an outer diameter D1 (mm) of the housing member specified by the bent portion in the cross direction and a bending length L1 (mm) of the specific bent portion in the cross direction is 10% or more and 13% or less.

(2)

The secondary battery according to (1), wherein an overlap ratio R2 (=(L2/D2)×100) calculated based on an outer diameter D2 (mm) of the lid member in the cross direction and an overlap length L2 (mm) in the cross direction of a region where the specific bent portion and the lid member overlap with each other in the housing direction is 6% or more and 9% or less.

(3)

The secondary battery according to (1) or (2), wherein the sealing member is bent along each of the side surface and the top surface of the lid member, and a thickness of the sealing member is gradually reduced in a direction from the side surface to the top surface.

(4)

The secondary battery according to (3), further including an adjacent member which is adjacent to the bottom surface of the lid member and has a bottom surface facing the battery element, and a side surface coupled to the bottom surface, wherein the bent portion is bent along each of the bottom surface of the adjacent member, the side surface of the adjacent member, the side surface of the lid member, and the top surface of the lid member, and a thickness difference DT (=T1−T2) calculated based on a thickness T1 (mm) of the sealing member at a position corresponding to the bottom surface of the adjacent member and a thickness T2 (mm) of the sealing member at a position corresponding to a tip of the bent portion is 0.1 mm or more and 0.3 mm or less.

(5)

The secondary battery according to any one of (1) to (4), wherein a thickness T3 (mm) of the specific bent portion is 0.27 mm or more and 0.31 mm or less.

(6)

The secondary battery according to any one of (1) to (5), further including an adjacent member which is adjacent to the bottom surface of the lid member and has a bottom surface facing the battery element, and a side surface coupled to the bottom surface, wherein the bent portion is bent along each of the bottom surface of the adjacent member, the side surface of the adjacent member, the side surface of the lid member, and the top surface of the lid member, and a total thickness TT (=T4+T5) calculated based on a thickness T4 of the lid member and a thickness T5 of the adjacent member is 0.8 mm or more and 1 mm or less.

(7)

The secondary battery according to any one of (1) to (6), wherein the outer diameter D1 of the housing member is 20 mm or more and 23 mm or less, and the outer diameter D2 of the lid member is 17.5 mm or more and 19.5 mm or less.

(8)

The secondary battery according to any one of (1) to (7), wherein the sealing member contains at least one of polybutylene terephthalate and polypropylene.

(9)

The secondary battery according to any one of (1) to (8), which is a lithium ion secondary battery.

(10)

A battery pack including:

the secondary battery according to any one of (1) to (9);

a controller that controls an operation of the secondary battery; and a switch section that switches the operation of the secondary battery according to an instruction of the controller.

(11)

An electric vehicle including:

the secondary battery according to any one of (1) to (9);

a convertor that converts electric power supplied from the secondary battery into drive power;

a drive section that operates according to the drive power; and a controller that controls an operation of the secondary battery.

(12)

An electric power storage system including:
the secondary battery according to any one of (1) to (9);
at least one electrical appliance that is supplied with electric power from the secondary battery; and
a controller that controls electric power supply from the secondary battery to the electrical appliance.

(13)

An electric power tool including:
the secondary battery according to any one of (1) to (9); and
a movable section that is supplied with electric power from the secondary battery.

(14)

An electronic apparatus including the secondary battery according to any one of (1) to (9) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery, comprising:
a housing member having a bent portion defining an open end;
a battery element configured to be accommodated in the housing member, wherein the battery element includes a positive electrode, a negative electrode, and an electrolytic solution;
a lid member which extends in a cross direction crossing a housing direction of the battery element to the housing member to close the open end of the housing member and has a bottom surface facing the battery element, a top surface opposite to the bottom surface, and a side surface coupled to the bottom surface and the top surface; and
a sealing member interposed between the bent portion and the lid member, wherein
the bent portion includes a specific bent portion bent along each of the side surface and the top surface of the lid member, and
a bending ratio R1 (=(L1/D1)×100%) calculated based on a first outer diameter D1 (mm) of the housing member specified by the bent portion in the cross direction and a bending length L1 (mm) of the specific bent portion in the cross direction is 10% or more and 13% or less,
wherein an overlap ratio R2 (=(L2/D2)×100%) calculated based on a second outer diameter D2 (mm) of the lid member in the cross direction and an overlap length L2 (mm) in the cross direction of a region where the specific bent portion and the lid member overlap with each other in the housing direction is 6% or more and 9% or less,
wherein the first outer diameter D1 ranges from 20.35 mm to 21.2 mm, and
wherein the second outer diameter D2 ranges from 17.7 mm to 19.32 mm.

2. The secondary battery according to claim 1, wherein the sealing member is bent along each of the side surface and the top surface of the lid member, and
a thickness of the sealing member is gradually reduced in a direction from the side surface to the top surface.

3. The secondary battery according to claim 2, further comprising an adjacent member that is adjacent to the bottom surface of the lid member and has a bottom surface facing the battery element, and a side surface coupled to the bottom surface, wherein
the bent portion is bent along each of the bottom surface of the adjacent member, the side surface of the adjacent member, the side surface of the lid member, and the top surface of the lid member, and
a thickness difference DT (=T1−T2) calculated based on a thickness T1 (mm) of the sealing member at a position corresponding to the bottom surface of the adjacent member and a thickness T2 (mm) of the sealing member at a position corresponding to a tip of the bent portion is 0.1 mm or more and 0.3 mm or less.

4. The secondary battery according to claim 1, wherein a thickness T3 (mm) of the specific bent portion is 0.27 mm or more and 0.31 mm or less.

5. The secondary battery according to claim 1, further comprising an adjacent member that is adjacent to the bottom surface of the lid member and has a bottom surface facing the battery element, and a side surface coupled to the bottom surface, wherein
the bent portion is bent along each of the bottom surface of the adjacent member, the side surface of the adjacent member, the side surface of the lid member, and the top surface of the lid member, and
a total thickness TT (=T4+T5) calculated based on a thickness T4 of the lid member and a thickness T5 of the adjacent member is 0.8 mm or more and 1 mm or less.

6. The secondary battery according to claim 1, wherein the sealing member includes at least one of polybutylene terephthalate and polypropylene.

7. The secondary battery according to claim 1, wherein the secondary battery includes a lithium ion secondary battery.

8. An electric power storage system comprising:
the secondary battery according to claim 1;
one or more electrical appliances that are configured to be supplied with electric power from the secondary battery; and
a controller configured to control the electric power supply from the secondary battery to the one or more electrical appliances.

9. An electric power tool comprising:
the secondary battery according to claim 1; and
a movable section configured to be supplied with electric power from the secondary battery.

10. An electronic apparatus comprising the secondary battery according to claim 1 as an electric power supply source.

11. A battery pack, comprising:
a secondary battery;
a controller configured to control an operation of the secondary battery; and
a switch configured to switch the operation of the secondary battery in accordance with an instruction from the controller,
the secondary battery including
a housing member having a bent portion defining an open end,
a battery element configured to be accommodated in the housing member, wherein the battery element includes a positive electrode, a negative electrode, and an electrolytic solution, a lid member which extends in a cross direction crossing a housing direction of the battery element to the housing member to close the open end of the housing member and has a bottom surface facing the battery element, a top surface opposite to the bottom surface, and a side surface coupled to the bottom surface and the top surface, and a sealing member interposed between the bent portion and the lid member, wherein the bent portion includes a specific bent portion bent along each of the side surface and the top surface of the lid member, and a bending ratio R1 (=(L1/D1)×100%) calculated based on a first outer diameter D1 (mm) of the housing member specified by the bent portion in the cross direction and a bending length L1 (mm) of the specific bent portion in the cross direction is 10% or more and 13% or less, wherein an overlap ratio R2 (=(L2/D2)×100%) calculated based on a second outer diameter D2 (mm) of the lid member in the cross direction and an overlap length L2 (mm) in the cross direction of a region where the specific bent portion and the lid member overlap with each other in the housing direction is 6% or more and 9% or less, wherein the first outer diameter D1 ranges from 20.35 mm to 21.2 mm, and wherein the second outer diameter D2 ranges from 17.7 mm to 19.32 mm.

12. An electric vehicle comprising:

a secondary battery;

a converter configured to convert electric power supplied from the secondary battery into drive power;

a driver configured to operate in accordance with the drive power; and a controller configured to control an operation of the secondary battery, the secondary battery including a housing member having a bent portion defining an open end, a battery element configured to be accommodated in the housing member, wherein the battery element includes a positive electrode, a negative electrode, and an electrolytic solution, a lid member which extends in a cross direction crossing a housing direction of the battery element to the housing member to close the open end of the housing member and has a bottom surface facing the battery element, a top surface opposite to the bottom surface, and a side surface coupled to the bottom surface and the top surface, and a sealing member interposed between the bent portion and the lid member, wherein the bent portion includes a specific bent portion bent along each of the side surface and the top surface of the lid member, and a bending ratio R1 (=(L1/D1)×100%) calculated based on a first outer diameter D1 (mm) of the housing member specified by the bent portion in the cross direction and a bending length L1 (mm) of the specific bent portion in the cross direction is 10% or more and 13% or less, wherein an overlap ratio R2 (=(L2/D2)×100%) calculated based on a second outer diameter D2 (mm) of the lid member in the cross direction and an overlap length L2 (mm) in the cross direction of a region where the specific bent portion and the lid member overlap with each other in the housing direction is 6% or more and 9% or less, wherein the first outer diameter D1 ranges from 20.35 mm to 21.2 mm, and wherein the second outer diameter D2 ranges from 17.7 mm to 19.32 mm.

* * * * *